US008768854B2

(12) United States Patent
Neville et al.

(10) Patent No.: US 8,768,854 B2
(45) Date of Patent: Jul. 1, 2014

(54) SECURE PROTOCOL FOR TRANSACTIONS

(76) Inventors: Stephen W. Neville, Victoria (CA); Michael Horie, North Saanich (CA)

( * ) Notice: Subject to any disclaimer, the term of this patent is extended or adjusted under 35 U.S.C. 154(b) by 121 days.

(21) Appl. No.: 13/142,849

(22) PCT Filed: Jan. 12, 2010

(86) PCT No.: PCT/CA2010/000029
§ 371 (c)(1),
(2), (4) Date: Jun. 29, 2011

(87) PCT Pub. No.: WO2010/081218
PCT Pub. Date: Jul. 22, 2010

(65) Prior Publication Data
US 2011/0276496 A1 Nov. 10, 2011

Related U.S. Application Data

(60) Provisional application No. 61/144,382, filed on Jan. 13, 2009.

(51) Int. Cl.
*G06Q 20/00* (2012.01)
(52) U.S. Cl.
USPC ............... 705/75; 705/24; 705/64; 705/39; 713/176; 713/177; 713/178; 713/179
(58) Field of Classification Search
CPC ..................................... G06Q 20/00
USPC ........................................... 705/75
See application file for complete search history.

(56) References Cited

U.S. PATENT DOCUMENTS

| 7,523,490 B2 | 4/2009 | Guo |
| 2002/0077993 A1 | 6/2002 | Immonen et al. |
| 2002/0170958 A1 * | 11/2002 | Madani .................... 235/380 |
| 2004/0098350 A1 * | 5/2004 | Labrou et al. ................ 705/64 |
| 2004/0107163 A1 | 6/2004 | Dutta et al. |
| 2004/0205011 A1 | 10/2004 | Northington et al. |
| 2007/0078751 A1 | 4/2007 | Craig |
| 2009/0119184 A1 | 5/2009 | Mages et al. |
| 2009/0276356 A1 | 11/2009 | Scipioni et al. |

FOREIGN PATENT DOCUMENTS

| EP | 1 388 797 | 2/2004 | |
| WO | WO 99/66436 | 12/1999 | |
| WO | WO 01/54015 | 7/2001 | |
| WO | WO 2009136404 A2 * | 11/2009 | ............ G06Q 20/00 |

OTHER PUBLICATIONS

Tobarra et al., "Formal Analysis of Sensor Network Encryption Protocol (SNEP)," *IEEE International Conference on Mobile Adhoc and Sensor Systems*, Pisa, Italy, pp. 1-6, Oct. 8-11, 2007.
International Search Report and Written Opinion dated Apr. 21, 2010, International Application No. PCT/CA2010/000029, 14 pages.

* cited by examiner

*Primary Examiner* — James A Reagan
(74) *Attorney, Agent, or Firm* — Klarquist Sparkman, LLP

(57) ABSTRACT

A secure protocol for transactions, such as electronic commerce transactions, is described that provides improved security through exploiting an independent (where this independence is logical and/or physical) communication path (e.g., between a customer and a back-end financial institution), ensuring that key financial information remains within the back-end financial institutions themselves. Hence, this protocol directly reduces cyber-crime risks through improvements to transaction security. In addition, various implementations of the secure protocol provide non-repudiation for one or more of the entities involved in the transaction.

27 Claims, 16 Drawing Sheets

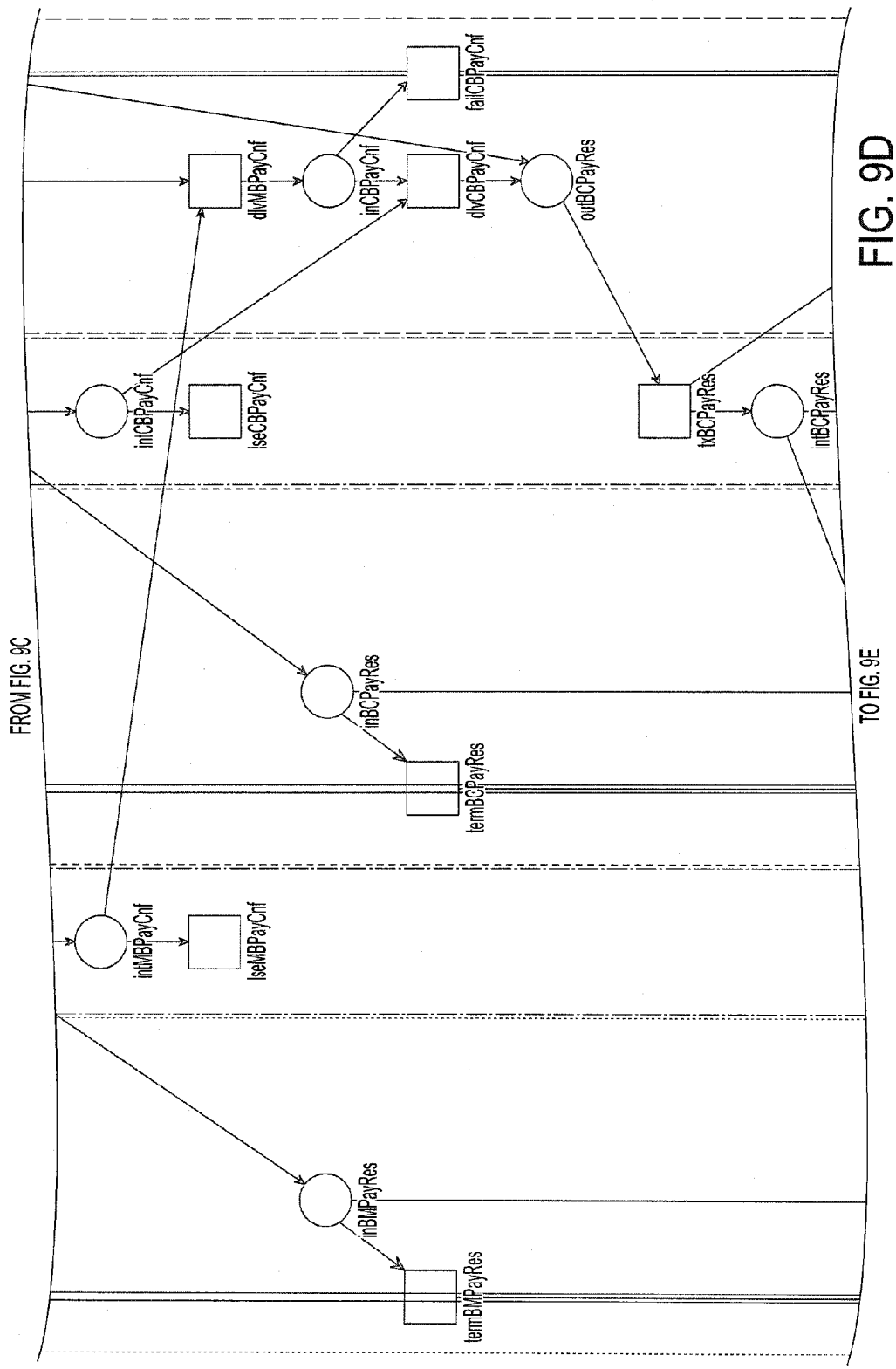

SECURE PROTOCOL FOR TRANSACTIONS

CROSS REFERENCE TO RELATED APPLICATIONS

This is the U.S. National Stage of International Application No. PCT/CA2010/000029, filed Jan. 12, 2010, which was published in English under PCT Article 21(2), which in turn claims the benefit of U.S. Provisional Application No. 61/144,382, filed Jan. 13, 2009. The provisional application is incorporated herein in its entirety.

BACKGROUND

Various approaches have been proposed to provide point-of-sale services with some level of security, starting with plain credit and debit cards, then cards with embedded chips, and now even cell phones, PDAs, and similar devices. The security of these approaches are predicated on: (a) the level of security of the customer-held entity through which the transaction is made, (b) assumptions around the nature of the environment(s) in which the payment system is used, and (c) the nature of what attacks are believed to be feasible. However, these various approaches do not fully exploit the independent communication path (where this independence is logical or physical) that can be established between the consumer and the back-end financial institution that acts as the guarantor of the purchase transaction, (e.g., from the consumer's cell phone or PDA via a mobile phone network to the consumer's bank).

There is a significant body of work devoted to investigating the use of cell phones and other mobile devices for everyday commercial transactions. One oft-cited and widely-deployed system is NTT DoCoMo's Osaifu-Keitai, or wallet cell phone. These cell phones use Sony's FeliCa contactless integrated circuit (IC) chip to support various e-cash systems such as Edy, and credit card systems such as iD (provided by NTT DoCoMo). Edy can be recharged using either the i-mode protocol or checkout points at participating vendors. A personal identification number (PIN) is used to authenticate the user for recharging e-cash, as well as for authorizing credit card purchases over 10,000 yen. Similarly, the iD credit card system requires the users merely to wave their device in front of a reader to charge a purchase, as long as the amount stays below 10,000 yen. A disadvantage is that a lost or stolen phone can be used for smaller purchases until the device is either locked remotely or runs out of funds. Furthermore, should a flaw in the FeliCa card be discovered that is as exploitable as the one used against the Mifare card, it could prove to be a formidable problem due to the high market penetration of these cell phones. Also, the PIN protection may be rendered useless in the presence of malware such as keyloggers. To date, many of the mobile payment systems have assumed that the cell phone is a trusted platform. While this is generally true of traditional cell phones, recent development of smart phones is seeing cell phones turn into general mobile computing devices. Nokia's N95, for example, has capabilities rivaling those of previous-generation laptop computers. Finally, the system does not take advantage of the direct connection that the phone could make to the bank, leaving this part entirely in the hands of the merchant.

Therefore, there exists ample opportunity for improvement in technologies related to providing secure transaction services.

SUMMARY

A variety of technologies related to improved security of transactions (e.g., financial or electronic commerce transactions, including mobile commerce) can be applied.

In a specific implementation, a secure protocol for transactions is proposed that provides improved security through exploiting an independent communication path (where this independence is logical or physical) (e.g., between a customer and a back-end financial institution) and ensuring that key financial information remains within the back-end financial institutions themselves. Hence, this protocol directly reduces cyber-crime risks through improvements to the security of transactions.

In one implementation of the secure protocol, a merchant communicates receipt information to a customer for a transaction to be conducted between the merchant and the customer. If the customer agrees, the customer communicates the receipt information to a financial institution. The financial institution, upon reviewing the receipt, confirms the transaction with the merchant and the customer. If the merchant and customer agree, the financial institution processes the transaction using customer financial information that is located only at the financial institution (and not on the customer device and not available to the merchant). The financial institution notifies the merchant and customer of the result of the transaction processing.

In some implementations of the secure protocol, non-repudiation is provided for various entities. In one implementation, non-repudiation is provided for the customer and the merchant. In another implementation, non-repudiation is provided for the customer, the merchant, and the financial institution.

In some implementations, the merchant and the customer separately send receipt information directly to the financial institution. In some implementations, the financial institution independently confirms the transaction directly with both the customer and the merchant.

Features and advantages will become apparent from the following detailed description, which proceeds with reference to the accompanying figures.

BRIEF DESCRIPTION OF THE DRAWINGS

FIGS. 9A-E depict a Petri net model corresponding to the second variation of the secure protocol.

DETAILED DESCRIPTION

1. Introduction

Figure 1:
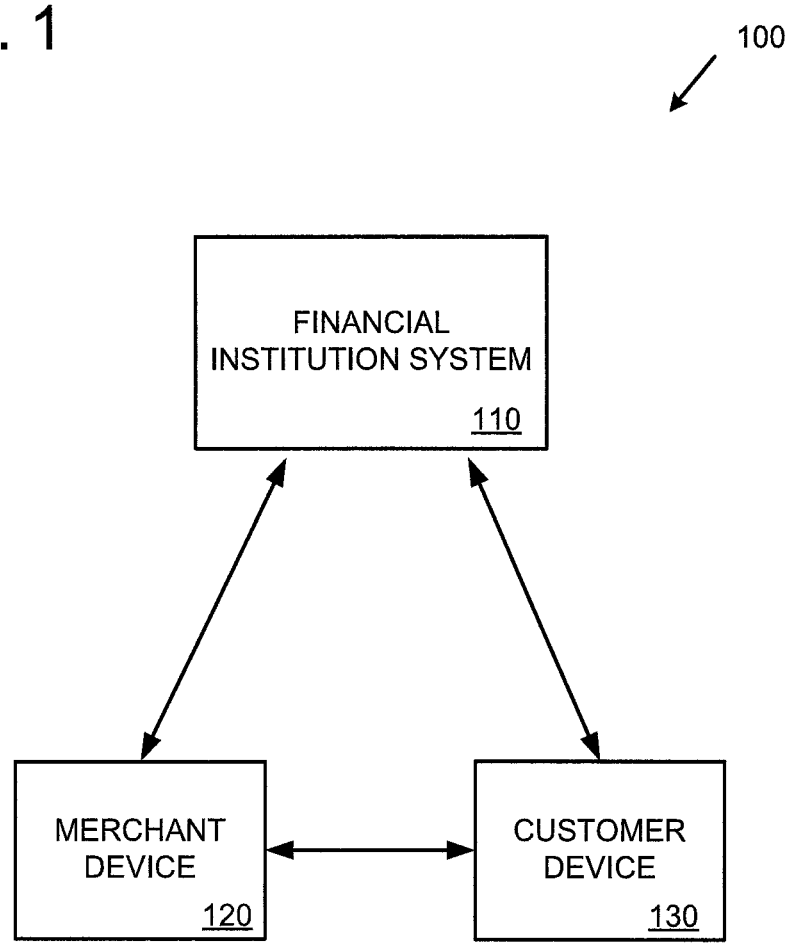
FIG. 1 is a diagram depicting an exemplary environment for implementing a secure protocol.

Electronic commerce has become the dominant mechanism to support transactions (e.g., point-of-sale transactions), whether these happen directly through interactions with a cashier or remotely via web-based eCommerce solutions. Daily, billions of dollars of point-of-sale transactions proceed through non-cash means, a change which has facilitated an increasingly global marketplace. Unfortunately, it has also opened the door to new forms of risk, particularly those associated with the outgrowth and development of various forms of cyber-crime.

Credit cards were the first wide-scale alternative to cash as a purchasing mechanism. The security of credit cards was primarily based on four factors: (a) comparison of the customer's signature with the one on the card's back, (b) the assumed difficulty in physically forging cards (e.g., as enforced through on-card holograms), (c) credit card companies indemnifying the retailer on customer non-payment, with the bank's risk in turn minimized through the formal card application process and interest charges, and (d) the credit card companies' extensive tracking of purchasing habits to detect aberrations. As technologies have become increasingly sophisticated and web-based eCommerce has grown, the efficacy of these security approaches have been significantly reduced, as evidenced by the collection and sale of credit card numbers being a major focus of cyber-crime.

More particularly, even as credit cards themselves have become relatively easy to duplicate physically, the growth of eCommerce has rendered such physical copying as largely superfluous. Instead, the card number, card-holder's name, and expiry date are all that are required to make an eCommerce purchase. Additionally, given that anyone can now buy from anywhere has acted to reduce the effectiveness of the tracking mechanism used by the credit card companies to identify and counter fraud. These issues of course have lead to increased credit card security, through in-card RFID tags for example; but the fundamental issues have remained largely unaddressed, since the card itself continues to hold sufficient information (e.g., sufficient personal financial information) to conduct a transaction. Furthermore, even if significant effort is required to break the security of smart cards, it can be financially attractive since breaking one device generally breaks all devices of the same class or family. Unless a card can be formally proven to be secure, which is an open research problem, this disadvantage will likely remain.

Debit cards, from the security perspective, attempt to rectify this situation by requiring pre-transaction customer input of a secret (i.e., the customer's Personal Identification Number (PIN)). Of course, the security of this data entry activity is itself suspect given that third-party observations of keypads is relatively easy to accomplish even without resorting to the more elaborate techniques that have been used, such as hidden spy cameras, complete PIN entry device forgeries, etc.

With the advent and wide-scale adoption of mobile computing devices (e.g., laptops, tablets, netbooks, cell phones, smart phones, and personal digital assistants (PDAs)), the opportunity has arisen to use these devices as alternatives to the more traditional credit card and debit card non-cash purchase transaction solutions. Many prior approaches, though, have assumed a very standard interaction model between the customer and the retailer in which the retailer is the only one to communicate with the underlying financial institution, primarily to receive assurance that the customer is financially able to engage in the transaction (i.e., to mitigate the retailer's risk). Thus the risk remains that an untrustworthy merchant uses this information to engage in cyberfraud.

Furthermore, the issue remains that the customer's device holds sufficient personal and/or financial information (e.g., customer credit card number) to engage in a transaction. Hence there remains a high incentive to break either the device's security, or the security of intermediate devices that interact with the customer's device. Of course, the advantage over smart cards is that cell phones and PDAs can at least have their firmware upgraded, in case a security flaw is detected. However, the increasing capabilities of these mobile devices also introduce a new problem since they have moved into the domain previously reserved for laptop computers. With this development comes the risk that cell phones can be subverted just like any other computer. Hence it is no longer appropriate to predicate transaction security on assumed full device security. The existence of malware targeting mobile operating systems (OSs), (e.g., keyboard loggers), is an increasing likelihood, if not already in existence. The financial incentives associated with using mobile platforms as point-of-sale devices will fuel such malware growth. Yet many proposed solutions have primarily proceeded via this increasingly untenable assumption that the device itself is innately secure.

The technologies, techniques, and tools described herein can be used to increase security of transactions (e.g., electronic commerce transactions, such as financial transactions or point-of-sale transactions) for both the retailer and customer (e.g., customers using computing devices, such as mobile computing devices), and by extension the financial institution, whether performed in person or over the web. The technologies described herein account for the general growth in the complexity and capabilities of these devices, from single use devices (e.g., cell phone, PDAs, etc.) to convergent mobile computing platforms (i.e., as combined cell phone, web browser, email client, camera, mp3 player, video camera, etc.). Hence, solutions are developed for both high- and low-trust platform assumptions. One of the technologies described herein is the development of a secure transaction protocol that utilizes the availability of the device's ability to communicate independently with the underlying financial institutions (e.g., via the cell phone network or 802.11 wireless network), to facilitate the necessary core change in the information exchange that describes the transaction event. In a specific implementation, in recognition of financial institutions' higher capacity to enact security solutions, the secure protocol is structured to ensure that customer financial information remains solely within the financial institution itself (attacker control of the customer-held device is insufficient in and of itself to engage in identity theft, because the customer financial information is not present on the customer device). Customer financial information includes sensitive information that can be used to access customer financial accounts (e.g., financial account information, credit card numbers, expiration dates, debit card numbers, personal identification numbers (PINs), name, address, date of birth, social security number, etc.).

Generally, the technologies described herein can be implemented in hardware and/or software of a computing device (e.g., a computer such as a laptop or desktop computer, cell phone, smart phone, netbook, PDA, tablet computer, or any other type of mobile or stationary computing device). A device can be operated by a customer (e.g., a customer and the customer's associated smart phone or laptop computer). A device can be operated by a merchant (e.g., a merchant and the merchant's on-line electronic commerce system or the merchant's point-of-sale system in a retail store).

Some examples and discussions used herein focus on mobile computing devices (e.g., cell phones, smart phones, laptops/netbooks, PDAs, etc.) as the customer-held computing device, but the technologies are not restricted to mobile device applications. The technologies (e.g., secure protocol) apply equally well to any transaction involving a customer, a seller/merchant, and an underlying financial institution(s).

For example, the secure protocol is equally applicable to improving the security of web-based electronic commerce applications involving home-based desktop computers.

2. Basic Transaction Model

This section discusses two different transaction scenarios. In the first scenario, a customer is physically present in a store to purchase goods from the merchant (e.g., retailer). In the second scenario, the customer wants to order via the web using a web browser. In terms of hardware requirements, the merchant has to have communication access to the bank (e.g., via a phone line or via the Internet). Note that the bank may be any entity or entities responsible for implementing the actual financial aspects of the transaction (e.g., financial institutions, credit card processing companies, on-line electronic processing services, etc.). The customer, too, must have access to the bank (e.g., via a cell tower or via a wireless protocol such as 802.11). The merchant and customer must also be able to communicate. Under the first scenario, a short-distance technology, such as infrared, is a possibility. An alternative would be Bluetooth, where one could reduce the power on the transmitter side such that different cash registers do not overlap in areas, slowly increase the cell phone transmission power levels until the first contact point is found, or select the closest register by signal strength. If a more powerful means were to be used, such as 802.11, there is a chance that if multiple checkout registers are active, the customer would have to select the correct transaction from those of other customers; however this does not prevent the use of 802.11. Alternatively, other types of wireless or wired communication solutions could be used for the merchant and customer to communicate. For example, the merchant could display a bar code on the screen which could be captured by the device's built-in camera, if available. Under the second scenario, any type of Internet communication could be used, in addition to other types of communication, such as short message service (SMS).

In a specific implementation of the secure protocol, the basic flow under both scenarios is as follows: The merchant communicates the receipt information to the customer's mobile device, using the merchant-customer communication link. If the customer agrees with the price, the customer's device then contacts the bank directly via the customer-bank link. The bank then attempts to confirm the receipt amount with the merchant, using the bank-merchant link. If the merchant agrees, the merchant informs both the bank and the customer of this, using the respective channels. The customer then acknowledges receipt of this confirmation to the bank. The bank then makes the final decision, based for example on the customer's credit balance, and informs the merchant and customer of the outcome.

The secure protocol can be entirely automated, or it can involve human interaction. For example, in some implementations, the secure protocol is entirely automated (automatically performed by the merchant device, customer device, and financial institution system). In other implementations, it is desirable to require that the human customer approve the receipt information received from the merchant (e.g., the receipt could include the product/service to be purchased, price, quantity, etc.). For example, the customer could view the receipt information from the merchant on the customer's device (e.g., view the receipt on the customer's cell phone display), at which time the customer could select an "approve" or "proceed" option to approve the purchase and then the remainder of the transaction could proceed automatically (via the customer device, merchant device, and financial institution system) without any other human interaction. In yet other implementations, additional human interaction could be incorporated (e.g., the human customer and/or human merchant could respond to a confirmation request from the financial institution system).

In another specific implementation, the secure protocol involves the following communications. The merchant contacts the customer, and the customer notifies the bank. The bank then double-checks with the merchant and the customer. Both have to confirm the transaction independently with the bank. When that is done, the bank notifies the merchant and customers separately.

In yet another specific implementation, the secure protocol involves the following communications. The merchant sends receipt information, for a transaction to be performed between the merchant and the customer, to the customer (e.g., product/service information, price, quantity, terms, etc.). The merchant and the customer independently send the receipt information to the bank. The bank (upon checking the received receipt information, e.g., to determine whether they match) then independently sends confirmation requests to the merchant and the customer. In response, the merchant and the customer independently send confirmations to the bank. The bank then processes the transaction (e.g., confirms that the confirmations are valid, performs funds checks, etc.) and sends results of the processing (e.g., transaction approved and successfully processed, transaction denied, etc.) independently to both the merchant and the customer.

It is important to note that at no point does the merchant receive customer financial information such as the customer's credit card number and card expiration date. Nor does the customer's device contain this customer financial information. It remains in the bank at all times. The only information that is exchanged between the parties are transaction identifiers identifying the current purchasing session. Once the purchase is either aborted or committed, the identifier loses its significance. The merchant also reveals a merchant identifier (ID) (e.g., the merchant's phone number) to the customer and bank, and the customer reveals a customer ID (e.g., the customer's cell phone number) to the bank. Finally, the parties involved will also know the price and possibly other purchase information (e.g., product/service information, quantity, etc.). In case of the IDs, this information is already readily obtainable by the receiving parties; and the purchase amount obviously is disclosed.

FIG. 1 shows an example environment 100 for implementing a secure protocol (e.g., a secure protocol for electronic commerce transactions, such as financial transactions). In the example environment 100, the secure protocol is used to perform transactions between a merchant (associated with merchant device 120) and a customer (associated with customer device 130) using the financial institution system 110. The financial institution system 110 is the entity that has access to, and processes, the transaction using customer financial information. For example, the financial institution system 110 can be a bank, a credit card processing system, an on-line financial institution, or the like. In general, the financial institution system 110 is the trusted entity in the environment 100 because it holds and accesses customer financial information. In the environment 100, the financial institution system 110 is the only entity that stores the customer financial information (the customer financial information is not stored on the customer device 130 or the merchant device 120). In addition, the customer financial information is not communicated between any of the entities (e.g., it is not communicated between the customer device 130 and the merchant device 120). Instead, the customer financial information is provided outside the scope of the transaction (e.g., it has been previously provided by the customer to the financial institution system).

Figure 2:
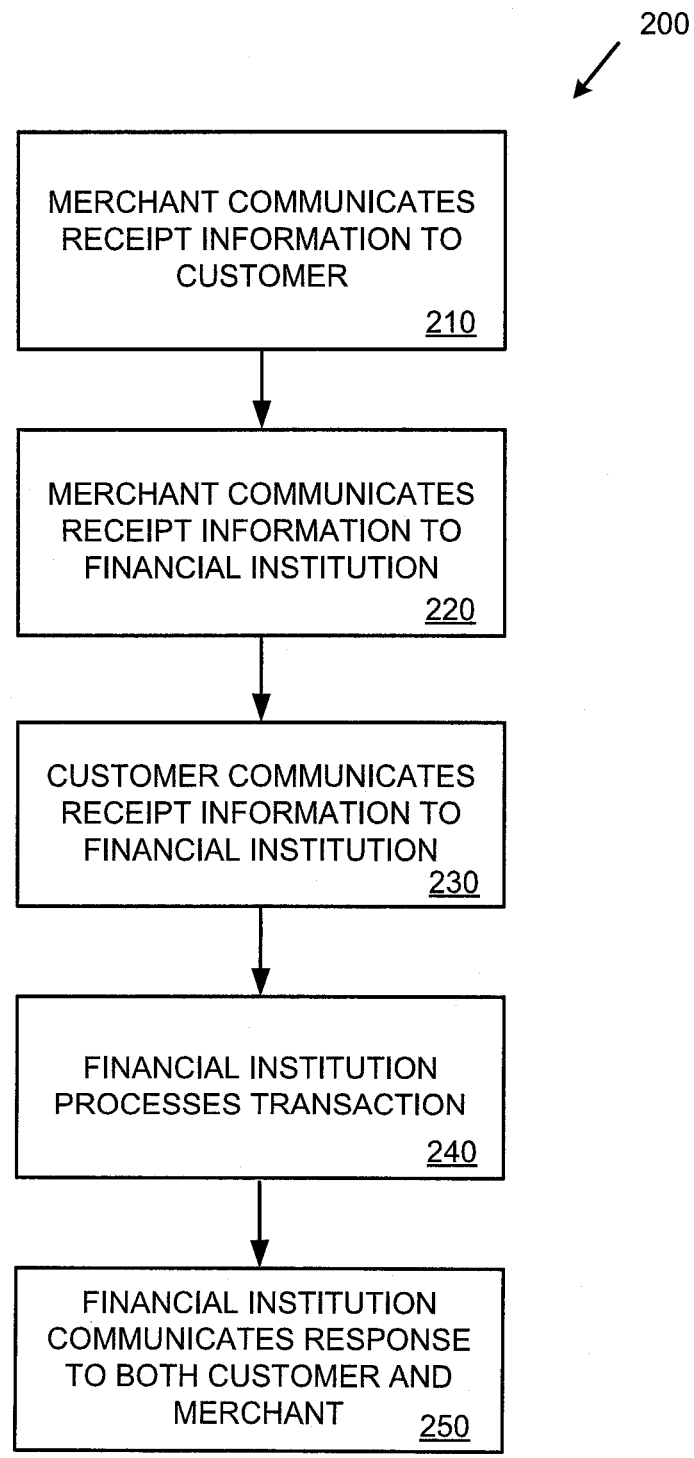
FIG. 2 is a flowchart showing an exemplary method for performing a transaction using a secure protocol.

FIG. 2 shows an exemplary method 200 for performing a transaction using a secure protocol. At 210, a merchant (e.g., via a merchant device) communicates receipt information to a customer (e.g., via a customer device). For example, the receipt information can represent a proposed (or potential) purchase by the customer of goods and/or services (e.g., the customer has indicated to the merchant that the customer would like to purchase a particular good or service).

At 220, the merchant communicates the receipt information to a financial institution system (e.g., a bank, credit card processing company, or another type of financial institution system). In some implementations, communications between the merchant and the financial institution system are signed by the merchant's private key and/or encrypted using the merchant's single-use session key. In some implementations, the receipt information is communicated directly by the merchant to the financial institution system, and in other implementations, the receipt information is communicated indirectly through the customer to the financial institution system.

At 230, the customer communicates the receipt information to the financial institution system. In some implementations, communications between the customer and the financial institution system are signed by the customer's private key and/or encrypted using the customer's single-use session key.

At 240, the financial institution system processes the transaction. For example, the processing may include checking that the receipts received from the merchant 220 and from the customer 230 match, that the customer has sufficient funds or credit to satisfy the transaction, that the merchant and/or the customer have independently confirmed (or approved) of the transaction, and/or that the identity of the merchant and/or customer have been confirmed.

At 250, the financial institution system communicates responses to both the merchant and the customer. For example, the response can include results of the transaction processing (e.g., that the transaction has been approved or denied).

Figure 3:
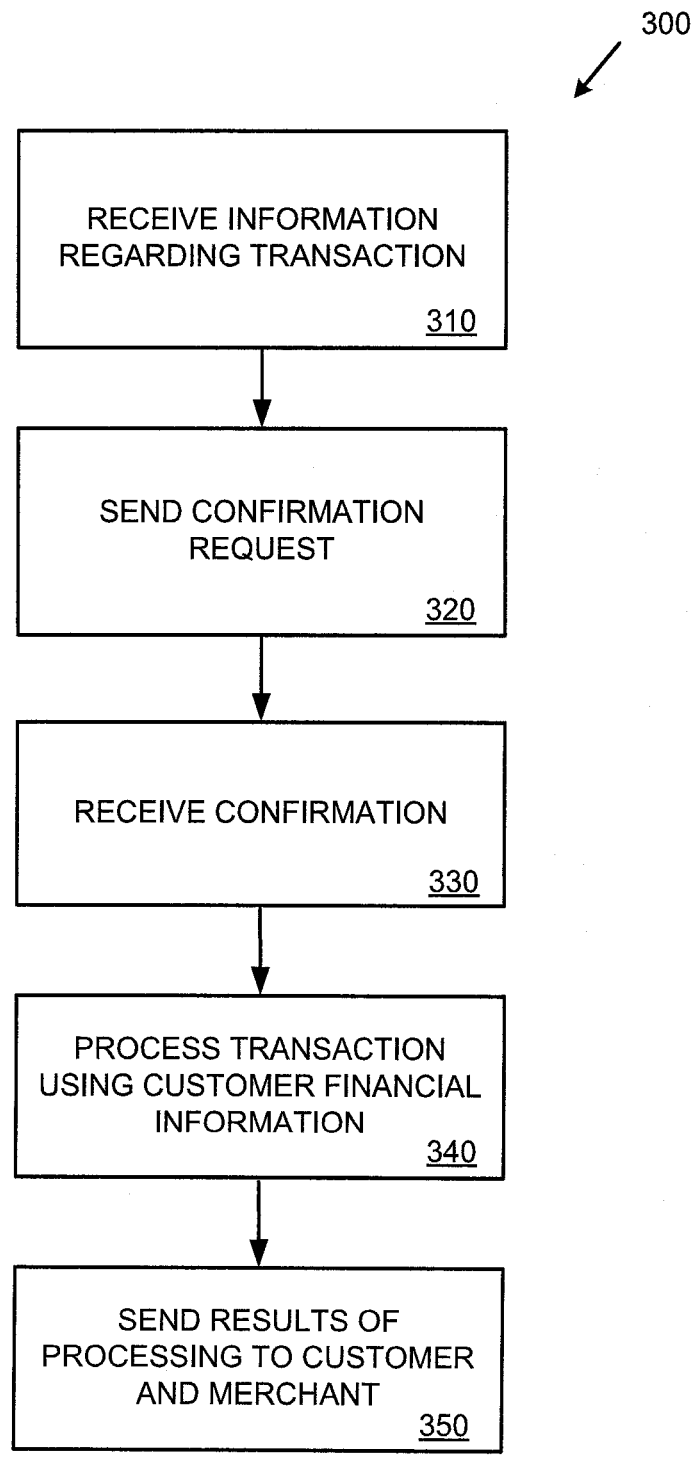
FIG. 3 is a flowchart showing an exemplary method for performing a transaction using a secure protocol by a financial institution system.

FIG. 3 shows an exemplary method 300 for performing a transaction using a secure protocol by a financial institution. At 310, receipt information is received by the financial institution system (e.g., a bank, credit card processing company, etc.). The receipt information relates to a transaction to be performed between a customer and a merchant. The receipt information can be received directly from the merchant, directly from the customer, or directly from both the merchant and the customer. For example, the receipt information can comprise information about a product or service that the customer wants to purchase from the merchant (e.g., product/service identification, price, quantity, etc.).

At 320, a confirmation request is sent from the financial institution system to the merchant, to the customer, or to independently to both the merchant and to the customer. The confirmation request is a request for the merchant and/or the customer to confirm the transaction.

At 330, the financial institution system receives confirmation from the merchant and/or customer.

At 340, the financial institution system processes the transaction. For example, the financial institution system can check for available funds of the customer. The customer financial information used to process the transaction (e.g., bank account information, credit or debit card numbers, PIN numbers, name, address, SSN, etc.) is located at the financial institution system (it is not provided to, or stored by, the merchant device, and it is not stored on the customer device).

At 350, results of the processing of the transaction are sent, by the financial institution system, to both the customer and the merchant. For example, the results can indicate whether the transaction was successfully processed.

3. First Variation of the Secure Protocol

In the first variation of the secure protocol, the customer must set up the customer's device (e.g., the customer's mobile payment device) by first contacting the bank to receive a list of single-use session keys, one per commercial transaction, and optionally to select a list of approved merchants. The merchant must also contact the bank to receive a list of single-use session keys. The merchant must also generate its own public/private key pair, and provide the public key to the bank (and the customer may optionally generate its own public/private key pair and provide the public key to the bank). The bank may optionally provide its public key to the merchant and the customer. Once this setup is complete, merchants and customers can engage in electronic commerce transactions until they run out of session keys, at which point the bank would have to be contacted for another list of keys.

In alternate implementations, the secure protocol uses the bank's public key instead of a single-use merchant session key and a single-use customer session key. In yet other alternate implementations, a multi-session merchant key and a multi-session customer key is used (a key that is used for multiple sessions, such as a key that is changed only occasionally).

Figure 4:
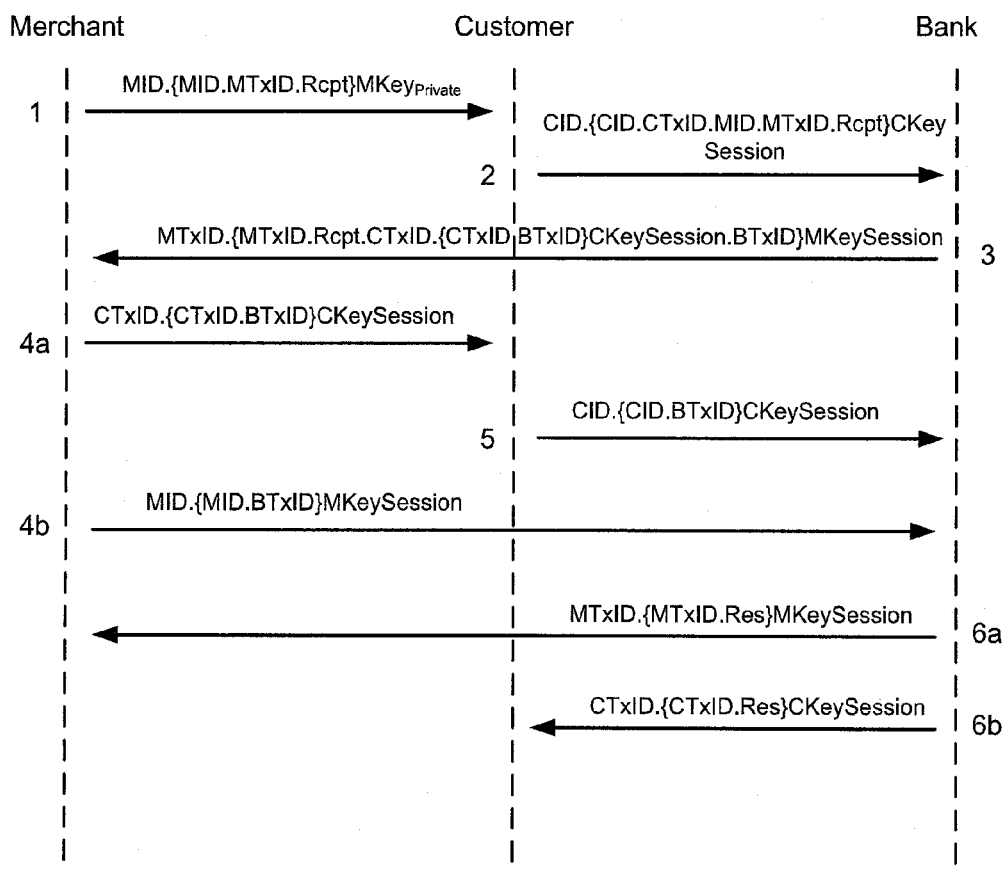
FIG. 4 is a diagram depicting operation of a first variation of the secure protocol.
Figure 5:
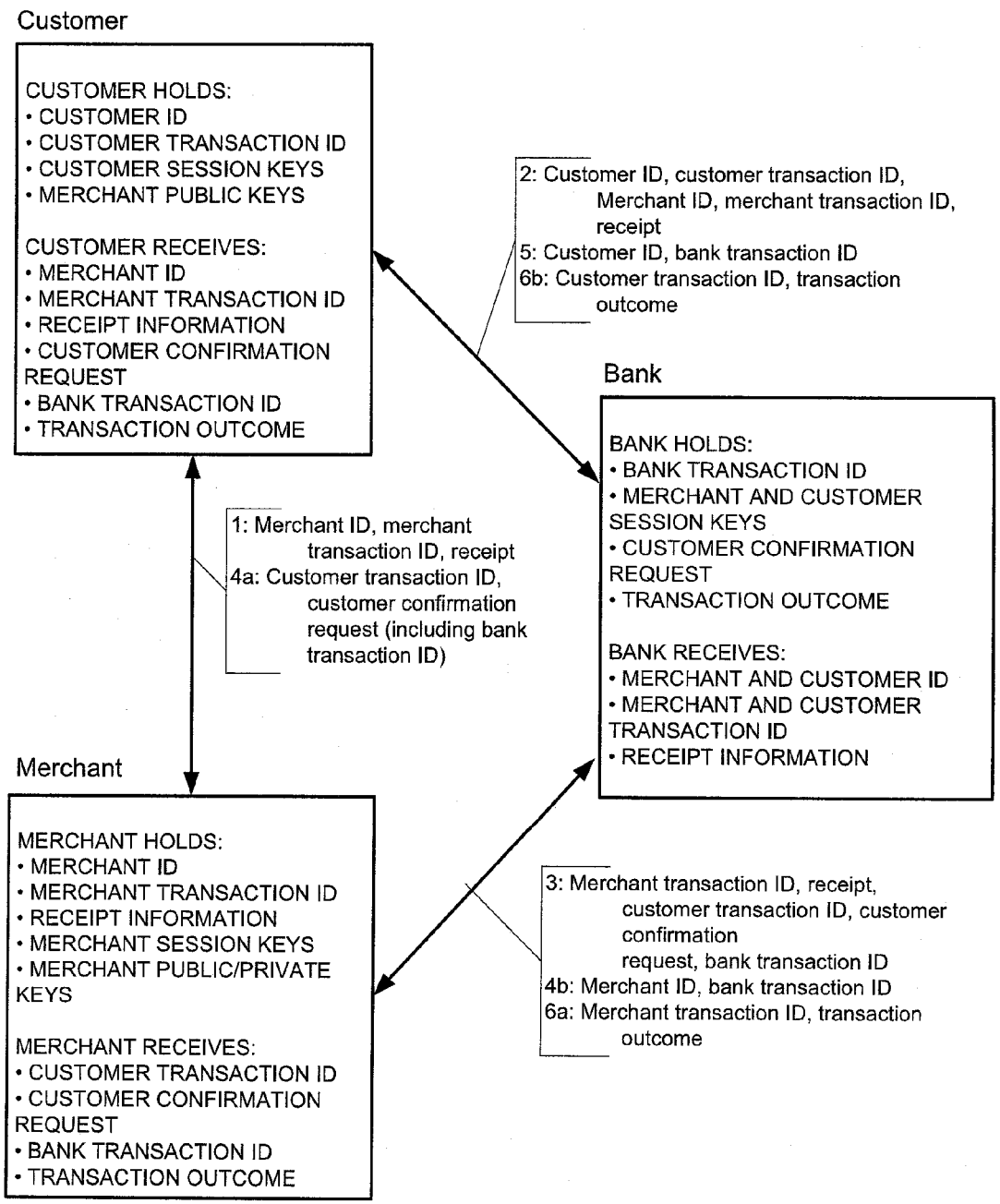
FIG. 5 is a diagram depicting information flow involved for the first variation of the secure protocol.

FIG. 4 is a diagram depicting the communication operations in detail for the first variation of the secure protocol. FIG. 5 is a diagram depicting general information flow involved for the first variation of the secure protocol, as well as a description of which information is held and received by each entity.

In relation to FIGS. 4 and 5, the merchant initiates the protocol by transmitting the globally-unique merchant's ID. This is followed by an encrypted version of the merchant ID, a transaction identifier which allows the merchant to distinguish the current transaction from other transactions, and general receipt information, such as the amount of the transaction. This communication is listed as "1" in FIGS. 4 and 5. By using the merchant's private key to encrypt the last three items, the customer can be sure that this information was not injected by an intruder. In an alternate implementation, a hash of the last three items is signed, rather than the three items themselves.

Upon receipt of this message, the customer's device checks the merchant ID. If it is not on the list of approved merchants, the transaction is aborted; it is up to the customer to contact the bank to add the current merchant to the list of approved merchants. (Note that customers may choose more generic options like "all merchants within a radius of 100 km of my home address" or "all merchants vetted by the bank." In the latter case, rather than downloading all the merchant public keys, the customer can accept a certificate from the merchant signed by the bank in order to obtain the key. However, by limiting the device to work only at select retailers, a higher level of confidence that the device will not be used in illicit transactions can be attained. Furthermore, it can be used as a parental control mechanism to ensure the device is only used at certain retailers. As another option, the customer could be limited to a specific dollar amount per month and/or per merchant.) If the merchant is on the list, the customer device uses the merchant's public key, which was obtained when the customer created a list of approved merchants, and decrypts the merchant ID, transaction identifier, and receipt amount. If the decrypted merchant ID does not match the unencrypted merchant ID, the message is considered forged, and the transaction is aborted. Alternatively, if the merchant device used its private key to sign a hash of the merchant ID, merchant transaction ID, and receipt information, the customer device verifies this hash with the merchant's public key. If there is no match, the message is considered forged. Otherwise, the name of the merchant, as well as the total amount, are displayed on the customer device screen. If the customer approves the transaction, the customer device sends out a message (this message is listed as "2" in FIGS. 4 and 5) consisting of the customer's ID, followed by an encrypted version of the customer's ID, a transaction ID which allows the customer to track the purchase, the merchant's ID, the merchant's transaction ID, and the receipt information. By encrypting this information with the customer's session key, replay attacks are avoided. In addition, in some implementations customer IDs can be temporary, globally unique IDs, to provide an increased measure of privacy.

The bank uses the customer ID to retrieve the customer's current session key. It then goes on to decrypt the remaining fields. Should the encrypted customer ID not match the unencrypted version, the message is considered forged, and the transaction is aborted. Upon a successful match, the bank uses the merchant ID to find out which merchant to contact. That merchant is then sent a message (this message is listed as "3" in FIGS. 4 and 5) encrypted with the merchant's current session key, containing the merchant's transaction ID, the receipt information, a confirmation message to be transmitted to the customer, as well as the bank's reference identifier for the current transaction.

The merchant then decrypts the message, and confirms that the transaction ID and receipt information match. This is the last point at which the merchant can abort unilaterally. When the merchant sends the bank's confirmation message to the customer (this message is listed as "4a" in FIGS. 4 and 5), thereby confirming the tie between the merchant and the customer for a particular transaction, the merchant will now have to wait for final confirmation from the bank. In terms of a two-phase commit, the merchant is now in the ready state. Note that the merchant also sends a confirmation directly to the bank (this message is listed as "4b" in FIGS. 4 and 5).

The customer's device decrypts the incoming message using the current session key, to retrieve the customer transaction identifier and the bank's transaction identifier. Once this message is received, the customer also enters the ready state (i.e., can no longer abort unilaterally). The customer informs the bank of this using a message transmission to the bank (this message is listed as "5" in FIGS. 4 and 5).

The bank is now able to proceed with the transaction. If sufficient funds are available, the transaction is approved. If there are insufficient funds, or the customer and/or merchant decline the transaction, it is denied. In either case, the result is transmitted to the merchant (this message is listed as "6a" in FIGS. 4 and 5) and customer (this message is listed as "6b" in FIGS. 4 and 5) along with their respective transaction identifiers.

If the merchant and/or customer do not receive this confirmation message, they will time out and have to retransmit their confirmation or declination. In the worst case, should the network go down during this phase, the merchant and customer will have to contact the bank using other channels to determine if the transaction succeeded. Should this not be possible or practical, the merchant must issue a declination certificate to the customer, allowing the customer to be credited by the bank, if applicable. This could either be electronic or on paper. Note that paper declinations are already issued, so it should not pose an issue with respect to existing purchase workflows.

As an aside, protocol communications 4a and 6b in FIG. 4 are similar in structure. It is important to note that the approval/denial message by the bank must not be interpretable as a transaction ID, to avoid a rare case where a late retransmission of step 4a is interpreted as an approval/denial by the bank. However, since the message from the merchant comes from a different channel than the message from the bank, this scenario can be avoided.

There are a number of protocol concerns that are addressed by the secure protocol. First is the confidentiality concern—party A should be certain that only the financial institution can view party A's financial information. Second is the authentication concern—party A should be certain that it is directly or indirectly communicating with party B (and not an impostor). Third is the non-repudiation concern—party A should be able to prove that it received a certain communication from party B. Fourth is the integrity concern—party A should be certain that no part of the communication was altered in transit. Fifth is the freshness concern—party A should be certain that it is not listening to an older (replayed) communication by party B.

The first variation of the secure protocol provides the following assurances:

Merchant: freshness, authentication, confidentiality, integrity, and non-repudiation. The one exception is that in some circumstances an eavesdropper may be able to know how much money the merchant is asking for a transaction in step 1a.

Customer: freshness, authentication, and confidentiality.

Financial Institution: freshness, authentication, and confidentiality.

4. Protocol Validation for First Variation of Secure Protocol

The first variation of the secure protocol discussed in the "First Variation of the Secure Protocol" section above has been analyzed using Automated Validation of Internet Security Protocols and Applications (AVISPA), a tool specifically designed to test protocols for their secrecy, authentication, and non-repudiation properties. Specifically, the AVISPA model was set up using three agents: the merchant, the customer, and the bank, with communication between these agents as defined as in FIG. 4.

As a result of analysis performed using the AVSIPA model, the first variation of the secure protocol has been validated to be secure.

Figure 6A:
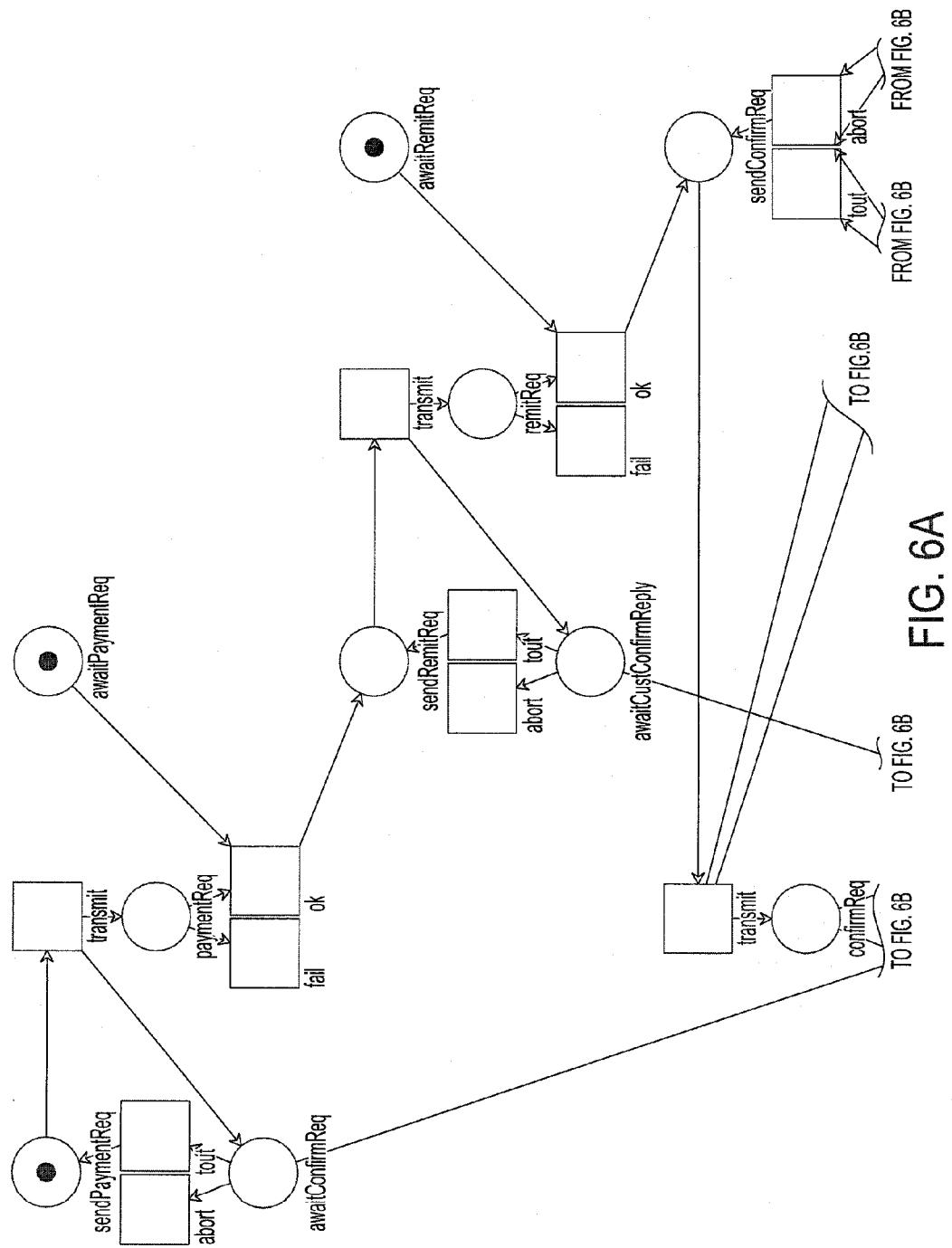
FIGS. 6A-C depict a Petri net model corresponding to the first variation of the secure protocol.
Figure 6B:
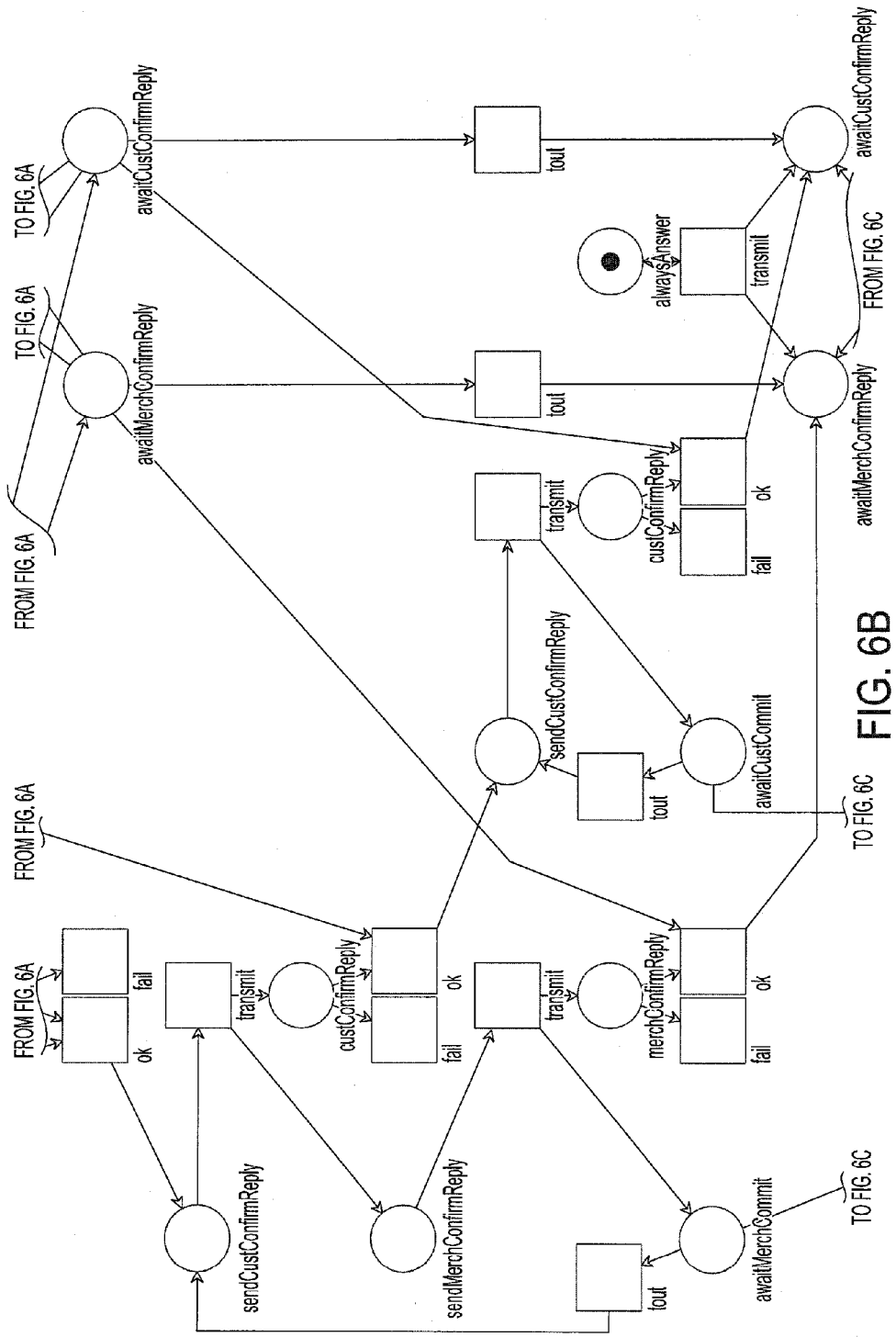
Figure 6C:
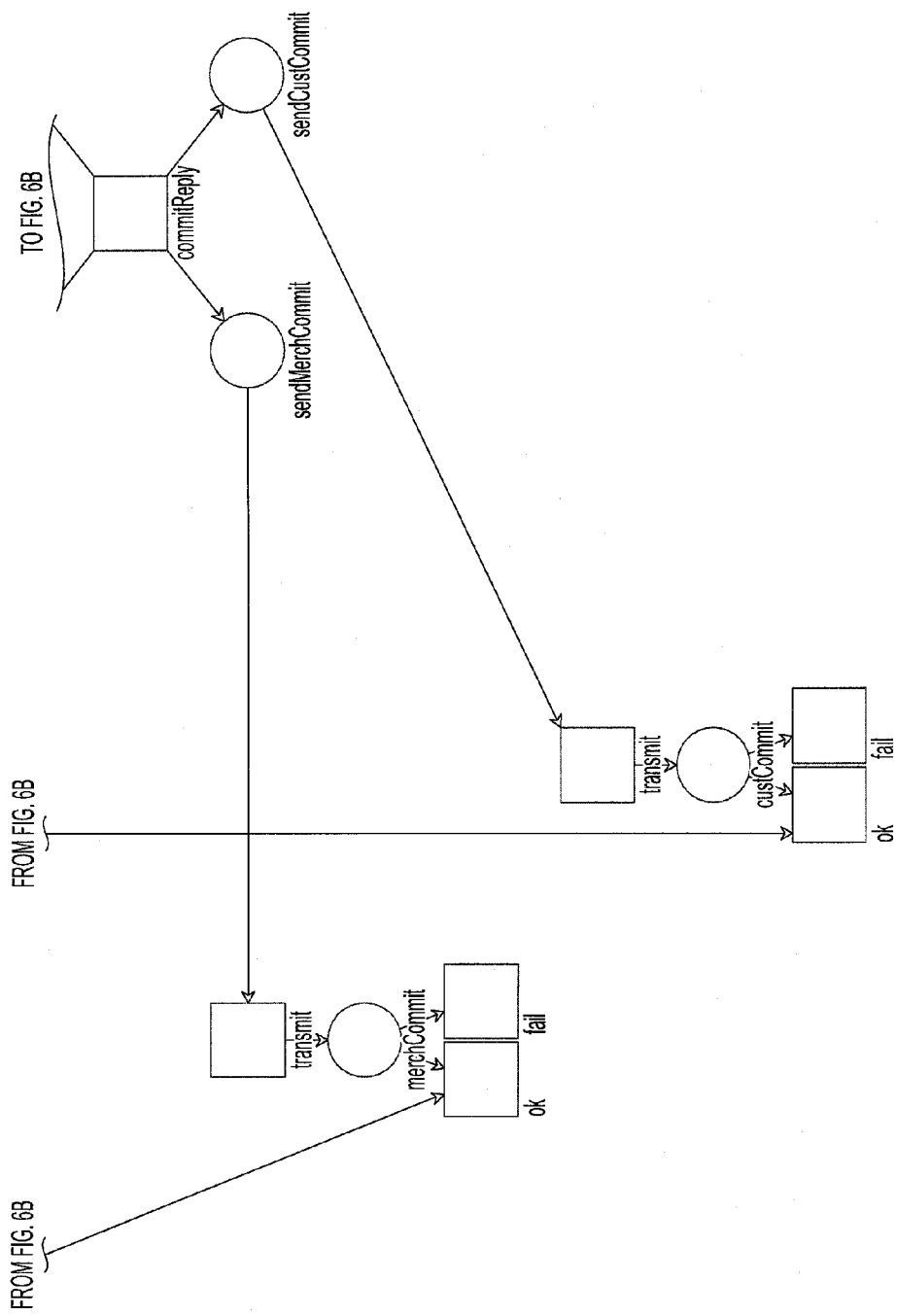

While AVISPA is suitable to validate security properties, it does not help to determine correctness with respect to deadlock or transactional correctness properties. For this aspect, Petri nets, as modeled and analyzed using Workflow Petri Net Designer (WoPeD), were used (WoPeD is open-source software developed at the Cooperative State University Karlsruhe). The WoPeD model, using WoPeD version 2.0.1, developed from the first variation of the secure protocol (as depicted in FIG. 4) is depicted in FIGS. 6A-C. In the WoPeD model (depicted in FIGS. 6A-C), the merchant is allowed to abort until sending out messages 4a/4b. After sending out either message 4a or 4b or both, the merchant enters the ready phase, and will not be allowed to either commit or abort until hearing from the bank in step 6a. In case a session-oriented protocol like TCP is used, an abort can be affected by closing the connection.

The customer is allowed to abort until transmitting message 5. After transmitting message 5, the customer enters the ready phase until hearing from the bank in step 6b.

The bank enters the ready phase after both messages 4b and 5 are received. Until that time, the bank is allowed to time out. To accommodate lost confirmations, the bank must always be available to let the merchant or customer know whether or not a particular transaction was committed or aborted, assuming the correct bank transaction ID is provided and the requesting party participated in the transaction. Thus, a merchant is not allowed to query transactions from a competing merchant, for example.

5. Second Variation of the Secure Protocol

The second variation of the secure protocol is similar to the first variation, but it eliminates piggybacking of requests and has an added measure of security. In the second variation of the secure protocol, the merchant transmits the payment request directly to the bank (step 1b in FIG. 7), rather than transmitting this information via the customer (as is done by the first variation of the secure protocol); and the bank contacts the customer directly for confirmation of the transaction (step 3a in FIG. 7), rather than transmitting the confirmation request via the merchant (as is done by the first variation of the secure protocol).

Figure 7:
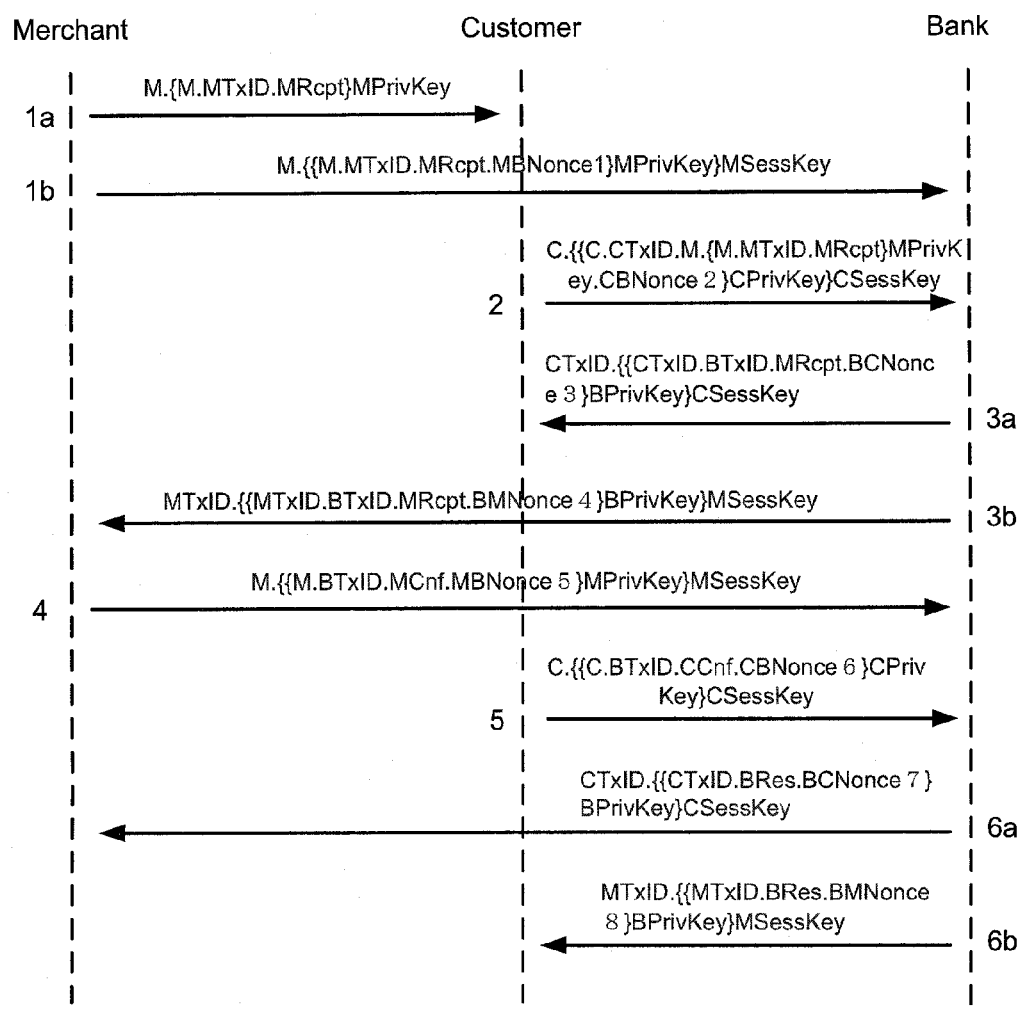
FIG. 7 is a diagram depicting operation of a second variation of the secure protocol.
Figure 8:
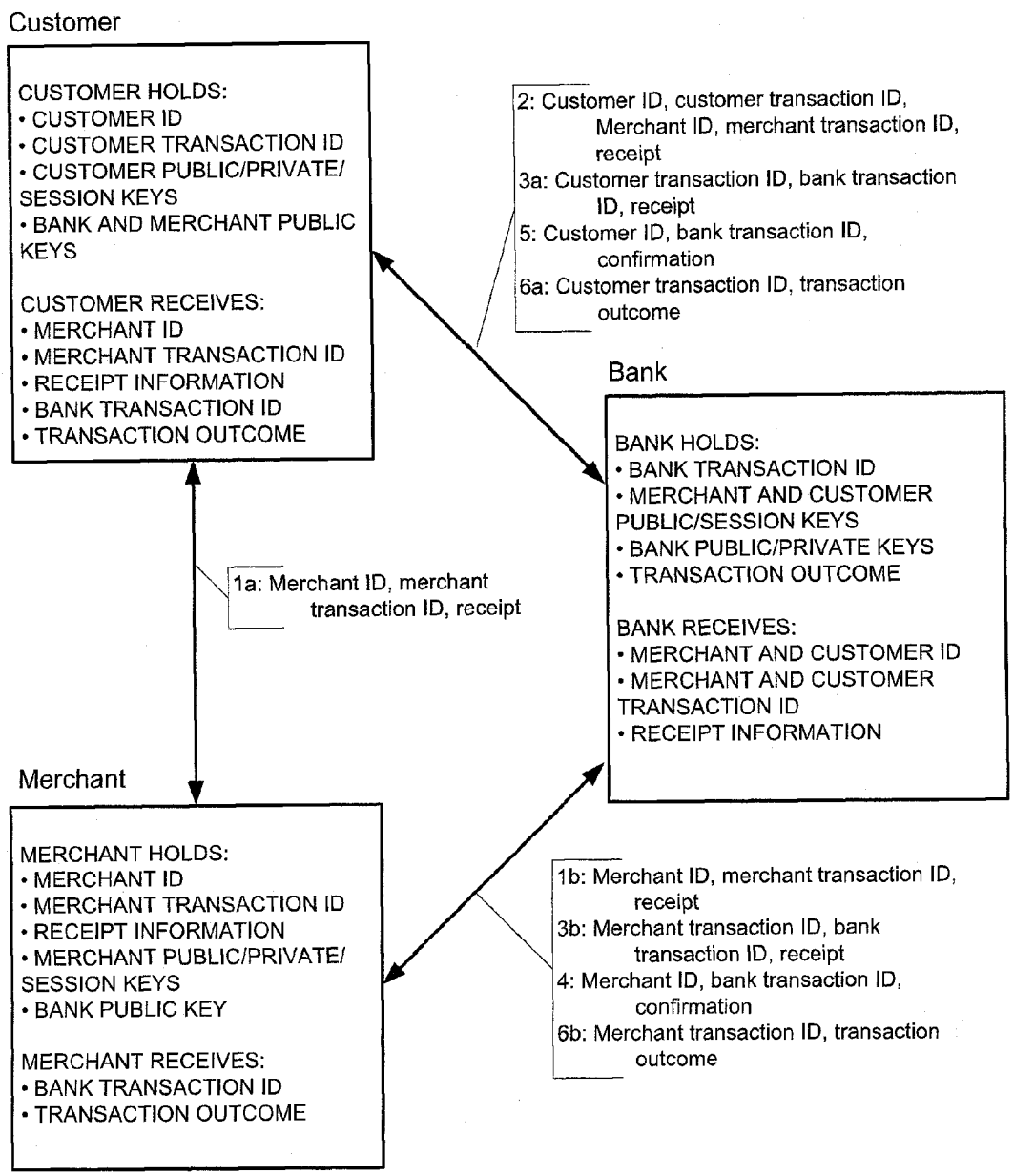
FIG. 8 is a diagram depicting information flow involved for the second variation of the secure protocol.
Figure 9A:
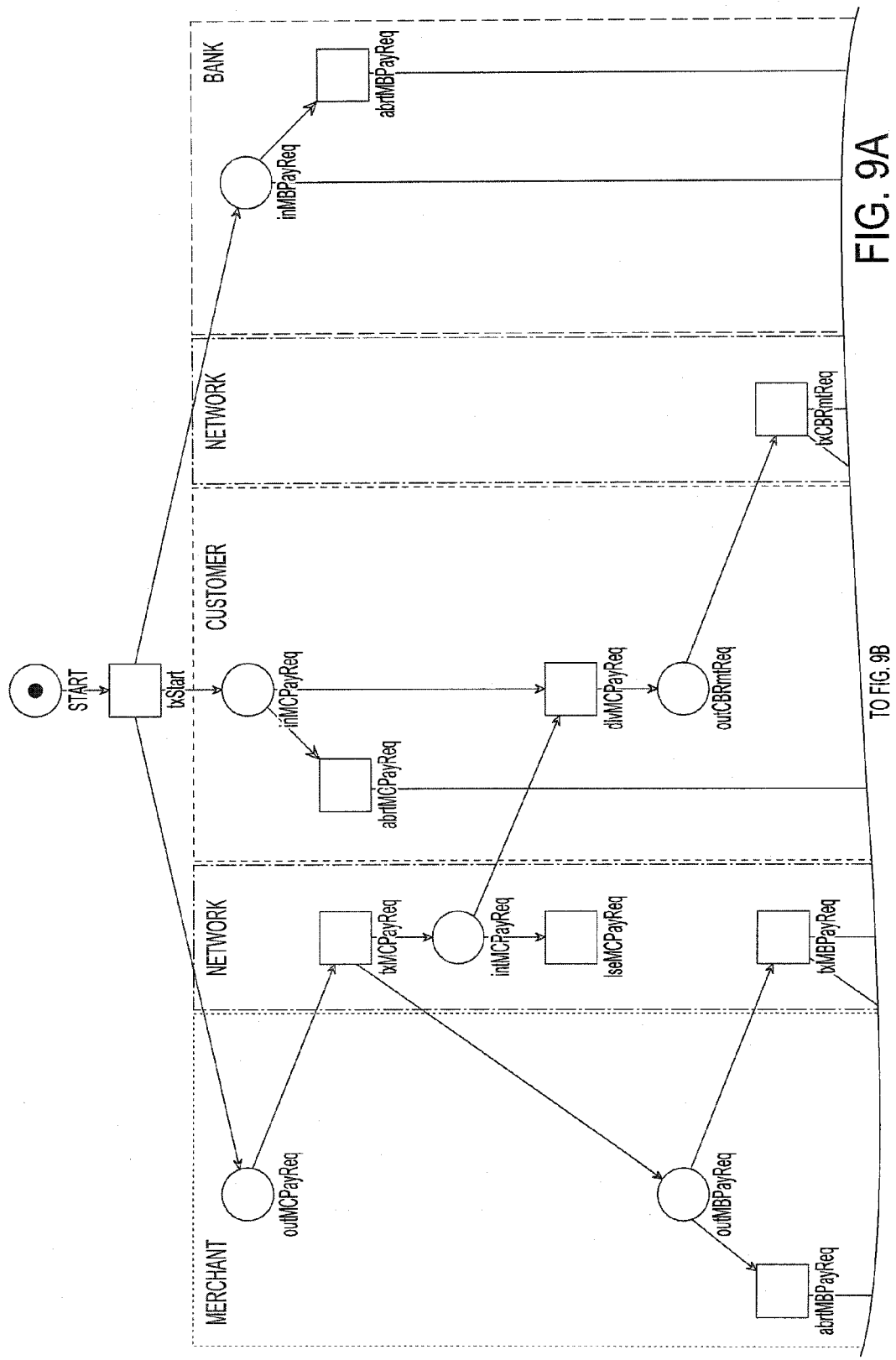
Figure 9B:
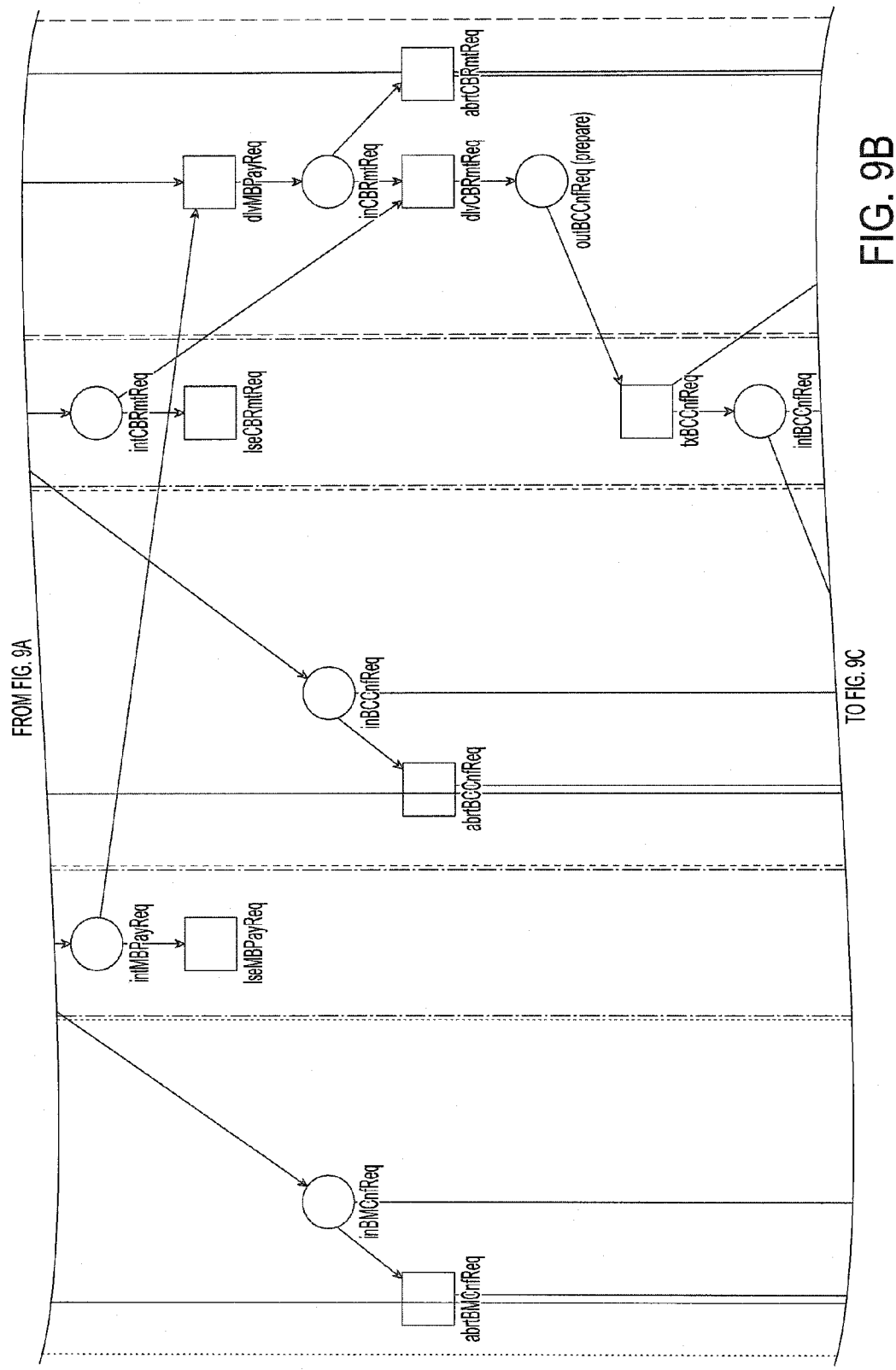
Figure 9C:
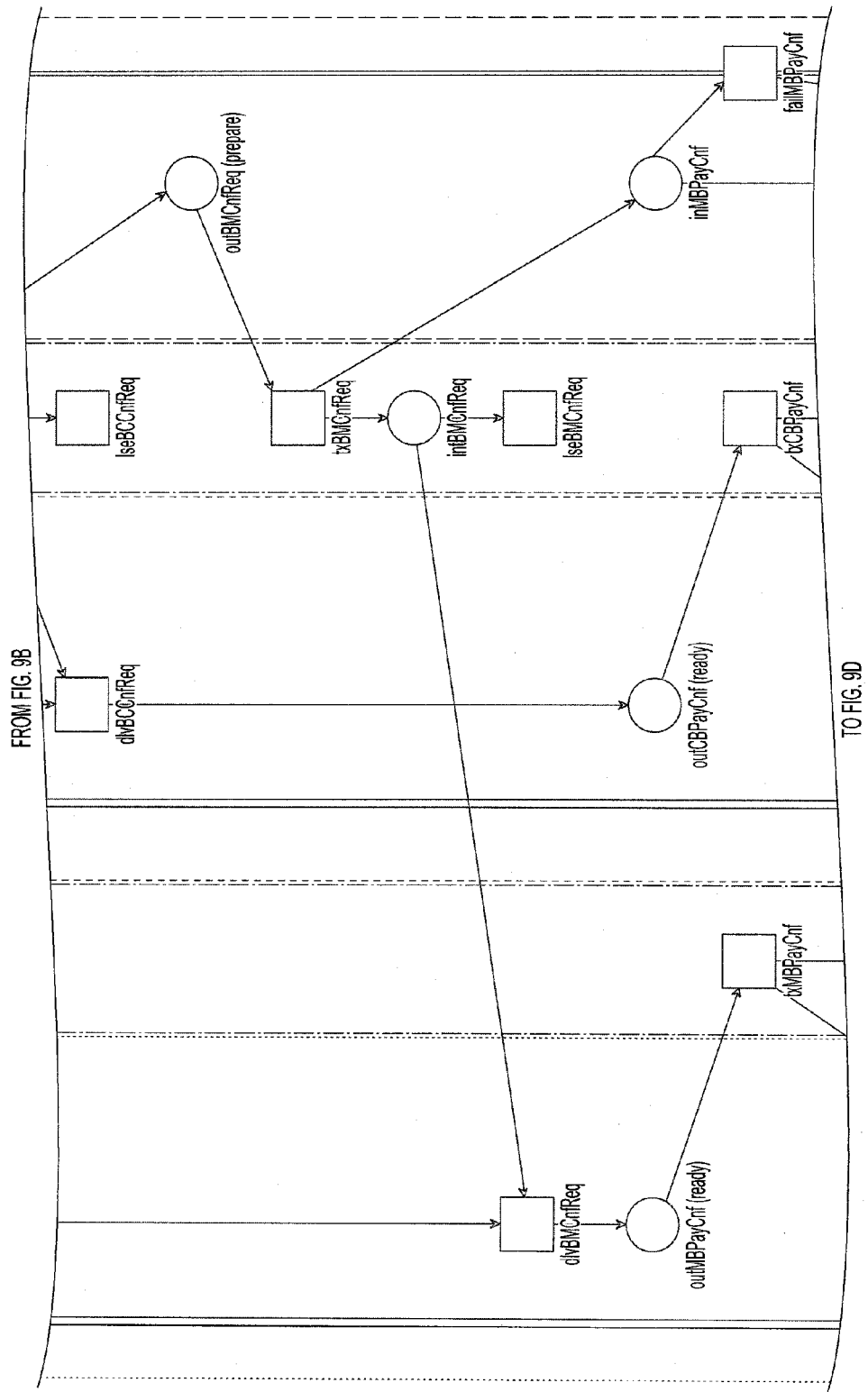
Figure 9E:
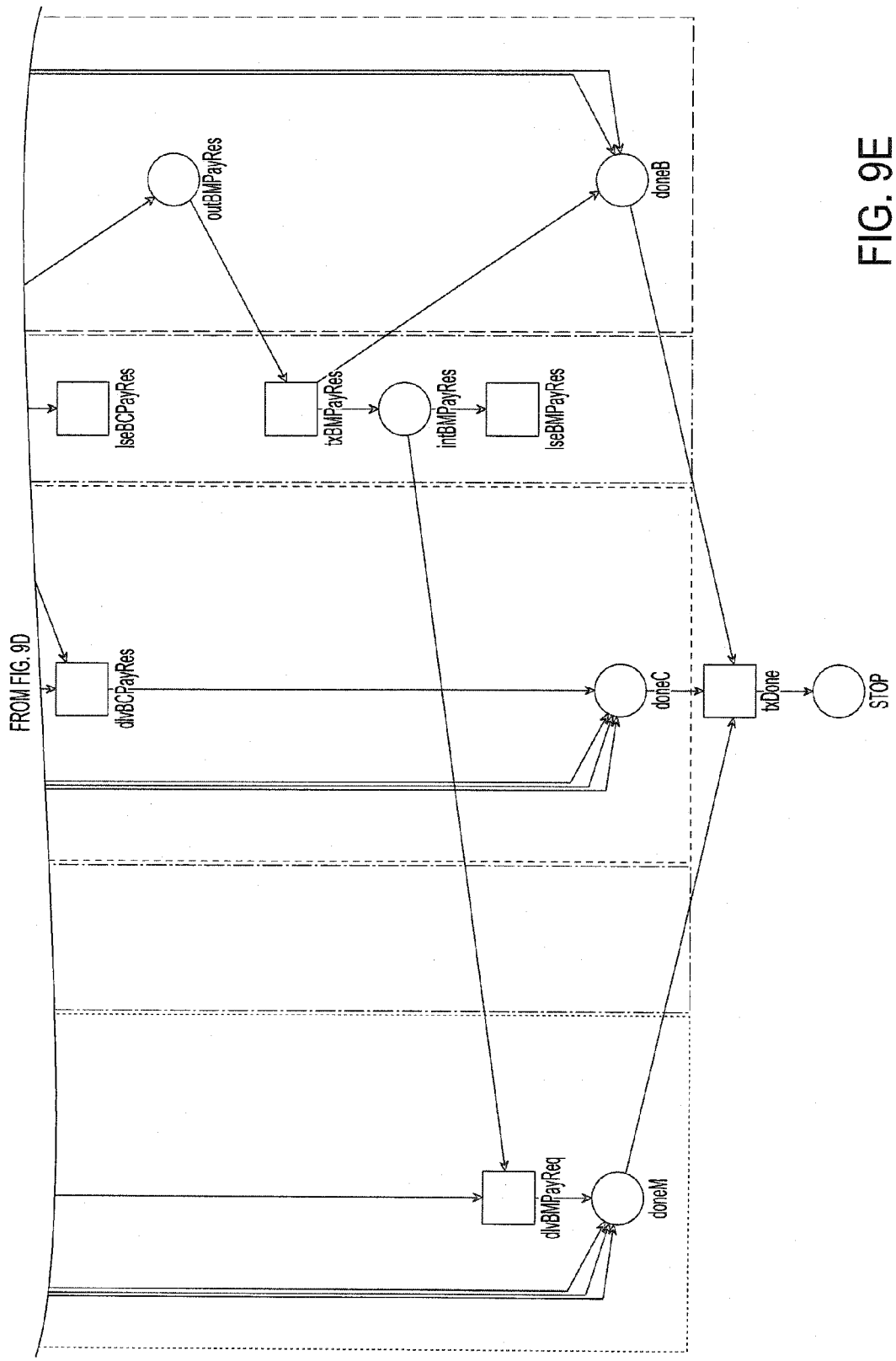

FIG. 7 is a diagram depicting the communication operations in detail for the second variation of the secure protocol. FIG. 8 is a diagram depicting general information flow involved for the second variation of the secure protocol, as well as a description of which information is held and received by each entity.

In relation to FIGS. 7 and 8, in step 1a, the merchant contacts the customer (as is done in the first variation). However, the merchant then also sends a copy of this request to the bank (step 1b), signed with the merchant's private key and encrypted with the merchant's session key. In step 2 (as depicted in FIGS. 7 and 8), the customer sends the payment request to the bank, signed with the customer's private key and encrypted with the customer's session key.

Upon receiving the request, the bank sends a confirmation request to the customer (step 3a in FIGS. 7 and 8) and the merchant (step 3b in FIGS. 7 and 8). The customer and merchant then can confirm (steps 5 and 4 in FIGS. 7 and 8, respectively). The bank then notifies customer and merchant of the outcome (steps 6a and 6b in FIGS. 7 and 8), which depends on a number of factors, such as customer and merchant consent and availability of funds. Optionally, the bank may decline at earlier steps, such as at 3a and 3b in FIGS. 7 and 8.

Note that the order of steps 1a and 1b in FIGS. 7 and 8 is not relevant, i.e., the merchant can first contact the bank and then the customer, or first the customer and then the bank, or both parties concurrently. This also applies to steps 3a and 3b, and steps 6a and 6b (in FIGS. 7 and 8). It also does not matter if step 2 completes before step 1b, or step 5 before step 4 (in FIGS. 7 and 8).

Note that unlike the first variation of the secure protocol, the second variation uses nonces containing random values. Various implementations may or may not choose to use these nonces as an additional measure of security, and nonces within a protocol session may or may not be related to each other. For example, MBNonce1 may provide a seed for BMNonce4, which in turn may provide a seed for MBNonce5, which may provide a seed for BMNonce8 (these specific nonce values are used as depicted in FIG. 7).

The second variation of the secure protocol (as depicted in FIGS. 7 and 8) also uses signatures at every step (unlike the first variation), as an additional measure of security. This allows for more complete non-repudiability, but some implementations may choose to use fewer signatures (e.g., as was done in the first variation). Further note that signatures may either be created by encrypting the elements in braces with the appropriate private key, or by signing over a hash of these elements.

The second variation of the secure protocol provides the following assurances:

Merchant: freshness, authentication, confidentiality, integrity, and non-repudiation. The one exception is that in some circumstances an eavesdropper may be able to know how much money the merchant is asking for a transaction in step 1a.

Customer: freshness, authentication, confidentiality, integrity, and non-repudiation.

Financial Institution: freshness, authentication, confidentiality, integrity, and non-repudiation.

6. Protocol Validation for Second Variation of Secure Protocol

The second variation of the secure protocol discussed in the "Second Variation of the Secure Protocol" section above has been analyzed using AVISPA (as was done with the first variation of the secure protocol). Specifically, the AVISPA model for the second variation of the secure protocol was set up using three agents: the merchant, the customer, and the bank, with communication between these agents as defined as in FIG. 7.

As a result of analysis performed using the AVSIPA model, the second variation of the secure protocol has been validated to be secure. In addition, the analysis performed using the AVISPA model confirms that the second variation of the secure protocol supports non-repudiation on the part of the customer, the merchant, and the bank.

While AVISPA is suitable to validate security properties, it does not help to determine correctness with respect to deadlock or transactional correctness properties. For this aspect, Petri nets, as modeled and analyzed using Workflow Petri Net Designer (WoPeD) were used. The WoPeD model, using WoPeD version 2.0.1, developed from the second variation of the secure protocol (as depicted in FIG. 7) is depicted in FIGS. 9A-E.

In the WoPeD model for the second variation (depicted in FIGS. 9A-E), the merchant is allowed to abort until sending out message 4. After sending this message, the merchant enters the ready phase and will not be allowed to either commit or abort until hearing from the bank in step 6b.

The customer is allowed to abort until sending out message 5. After sending this message, the customer enters the ready phase and will not be allowed to either commit or abort until hearing from the bank in step 6a.

The bank enters the ready phase after receiving both messages 4 and 5. Until that time, the bank is allowed to time out. To accommodate lost confirmations, the bank must always be available to let the merchant or customer know whether or not a particular transaction was committed or aborted, assuming the correct bank transaction ID is provided and the requesting party participated in the transaction. Thus, a merchant is not allowed to query transactions from a competing merchant, for example.

7. Device Trade-Offs

In addition to considering the protocol itself, it is important to evaluate the security of the physical platform as well. As mentioned earlier, the move from a dedicated phone platform to a general computing platform opens up opportunities for malware writers as well; but even dedicated "secure" devices can be circumvented, sometimes with surprisingly little effort. Therefore, one of the first lines of defense is to protect all critical computing device (e.g., cell phone, computer, etc.) components from the effects of a compromise. This could include measures such as using a cryptographic processor to store session keys and potting the cell phone display, keyboard, and other circuitry used to implement the above protocol into a single unit. (Potting is a technical term describing the encapsulation of electronic components into a single assembly unit, and filling the unit with a solid compound. The idea in this case is to make it difficult to remove the compound without destroying the encapsulated units.)

Another concern is the leakage of critical information to the merchant, which would allow a malicious merchant to double charge or even steal the customer's credit information. For this reason, the secure protocol discussed herein does not make credit or debit account information available to the merchant. The merchant only receives a confirmation which is tied against a single transaction previously sighted by the customer. Credit card and bank account information will not be delivered to the merchant nor the customer. It will stay at the bank. Requiring both parties to submit their confirmations individually also makes it more difficult for a customer to claim fraudulently that the transaction was not approved.

To prevent a customer from approving a transaction from someone impersonating a merchant, the customer can preselect approved merchants. This is to prevent scenarios where, for example, a customer wants to pay for an item, but instead of connecting to the merchants' point of sale terminal, the customer connects to a hidden terminal belonging to an intruder masquerading as the merchant. The use of approved merchants (e.g., approved by the financial institution system) is an optional security feature that can be added (or removed) from any of the secure protocol variations and implementations described herein.

Another concern is the loss or theft of a cell phone (or other device). The fact that the cell phone contains only a limited number of keys, perhaps associated with a maximum spending limit, can limit the impact somewhat. A PIN can furthermore be used to protect the session keys, as long as the physical platform is protected as above. Of course, once the bank is notified, it is trivial to block the purchases. A range of additional approaches, including expiring the keys, can also be used to protect against lost or stole mobile devices.

It should be noted that if the platform itself can be trusted (e.g., the phone can only run programs provided by the manufacturer of the device), then it is possible to relax certain requirements such as the use of a cryptographic processor and potting of critical components (e.g., the display and keyboard) into a single unit.

8. Conclusions

The technologies described herein describe a secure protocol designed to support the use of computing devices (e.g., mobile computing devices such as cell phones) in everyday commercial transactions. It was designed to function in an environment where neither merchant nor customer can fully trust each other. Security is provided in hardware and software. In the case of a general mobile computing device, hardware security can be achieved by using a cryptographic processor for storing session keys, and by potting the cell phone display, keyboard, and other circuitry used to implement the secure protocol discussed, into a single unit. With a dedicated device, this restriction can be relaxed. In terms of the software, the protocol itself avoids providing sensitive information such as the credit card number and expiry date to the merchant. Transmission is limited to transaction identifiers, receipt information, and merchant and customer IDs. In a software implementation a mobile device's trusted computing platform would provide underlying services to the protocol implementation, such as the secure storage of the protocol's session keys.

One of the major advantages over many other schemes is that confidential information like credit card numbers and expiration dates, are never exchanged. Thus the merchant does not have sufficient information to use this information without authorization to process additional payments. Furthermore, the customer does not have to enter a PIN into a device that is permanently attached to a merchant's terminal, thereby increasing the risk that it was subverted. For the bank, too, this is an advantage since it prevents the high cost of credit card skimming fraud. In terms of infrastructure, the merchant already has a link to the bank to process traditional debit and credit card transactions; a customer's cell phone already has access to the cell network; and banks already protect their infrastructure from attacks, hence this particular protocol does not require the banks to shoulder additional, significant costs.

9. AVISPA Model File for First Variation of Secure Protocol

As mentioned above AVISPA was used to validate the security of the first variation of the secure protocol. Specifically, AVISPA version 1.1 was used with the model file below. First, AVISPA's -satmc option was used to check that the protocol flow itself is executable, i.e., that there are no mismatched send (Snd) and receive (Rcv) statements. The protocol flow was then manually double-checked using the -ofmc -p options, which allows a step-by-step trace. aknows had to be commented out in the process, since this -ofmc does not support it; however, this is not an issue since this step was only used to ensure that the message flow is correct; it was not used to check for security per se. Finally, the cl-atse option was used to do the actual validation.

```
role merchant (
    M, B: agent ,
    MPubKey : public_key ,
    MSessKey : symmetric_key ,
    Snd , Rcv: channel (dy))
played_by M def=
local
    MTxId , Rcpt , CTxId , BTxId , Res: text ,
    CReply : { text . text } _symmetric_key ,
    State: nat
init
    State := 0
```

```
transition
0. State = 0
    ∧ Rcv( start)
    =|>
    State ' := 1
    % Create merchant session identifier and receipt
    ∧ MTxId ' := new ( )
    ∧ Rcpt ' := new ( )
    % Send out request to customer
    ∧ Snd(M.{M.MTxId '. Rcpt '} _inv ( MPubKey))
1. State = 1
    % Receive reply from bank
    ∧ Rcv( MTxId .{ MTxIdRcpt .CTxId '.CReply '. BTxId '} _MSessKey )
    =|>
    State ' := 2
    % Send confirmation to customer and bank
    ∧ Snd(CTxId '. CReply ')
    ∧ Snd(M.{M.BTxId '} _MSessKey )
    ∧ aknows(M, B, merchant_bank , M.{M.BTxId '} _MSessKey )
2. State = 2
    % Receive commit from bank
    ∧ Rcv( MTxId .{ MTxId.Res '} _MSessKey )
    =|>
    State ' := 3
    ∧ aknows (M, B, bank_merchant , MTxId.{ MTxId.Res '} _MSessKey )
end role
% ==========
role customer (
    M, C, B: agent ,
    MPubKey : public_key ,
    CSessKey : symmetric_key ,
    Snd , Rcv : channel (dy))
played_by C def=
local
    MTxId , Rcpt , CTxId , BTxId , Res: text ,
    State: nat
init
    State := 50
transition
0. State = 50
    % Receive request from merchant
    ∧ Rcv(M.{M.MTxId '. Rcpt '} _inv ( MPubKey))
    =|>
    State ' := 51
    % Create customer session identifier
    ∧ CTxId ' := new ( )
    % Send request to bank
    ∧ Snd(C.{C.CTxId '.M.MTxId '. Rcpt '}_CSessKey )
    ∧ aknows (C, B, customer_bank , C.{C.CTxId '.M.MTxId '. Rcpt '}
        _CSessKey )
1. State = 51
    % Receive reply from bank via merchant
    ∧ Rcv( CTxId .{ CTxId.BTxId '} _CSessKey )
    =|>
    State ' := 52
    % Send confirmation to bank
    ∧ Snd(C.{C.BTxId '} _CSessKey )
2. State = 52
    % Receive commit from bank
    ∧ Rcv( CTxId .{ CTxIdRes '} _CSessKey )
    =|>
    State ' := 53
    ∧ aknows(C, B, bank_customer , CTxId.{ CTxId.Res '} _CSessKey )
end role
% ==========
role bank (
    M, C, B: agent ,
    MSessKey , CSessKey : symmetric_key ,
    Snd , Rcv: channel (dy))
played_by B def=
local
    MTxId , Rcpt , CTxId , BTxId , Res: text ,
    State: nat
init
    State := 100
transition
0. State =100
    % Receive request from customer
    ∧ Rcv(C.{C.CTxId '.M.MTxId '. Rcpt '}_CSessKey )
```

```
        =|>
        State ' := 101
        % Create bank session identifier
        ∧ BTxId ' := new ( )
        % Send confirmation request to merchant
        ∧ Snd(MTxId '.{ MTxId '. Rcpt '. CTxId '.{CTxId '. BTxId '}
            _CSessKey .BTxId '}_MSessKey )
        ∧ aknows(B, C, customer_bank , C.{C.CTxId '.M.MTxId '. Rcpt '}
            _CSessKey )
1. State = 101
        % Receive confirmation from customer and merchant
        ∧ Rcv(C.{C. BTxId} _CSessKey )
        ∧ Rcv(M.{M. BTxId} _MSessKey )
        =|>
        State ' := 102
        % Create bank response ( APPROVE/DENY )
        ∧ Res ' := new ( )
        % Send out response to merchant and customer
        ∧ Snd( MTxId .{ MTxId.Res '} _MSessKey )
        ∧ Snd( CTxId .{ CTxId.Res '} _CSessKey )
        ∧ aknows (B, M, merchant_bank , M.{M.BTxId} _MSessKey )
        ∧ aknows (B, M, bank_merchant , MTxId.{ MTxId.Res '} _MSessKey )
        ∧ aknows (B, C, bank_customer , CTxId.{ CTxId.Res '} _CSessKey )
end role
% ==========
role session (
        M, C, B: agent ,
        MPubKey : public_key ,
        MSessKey , CSessKey : symmetric_key
)
def=
local
        SndM , RcvM , SndC , RcvC , SndB , RcvB :channel (dy)
composition
        merchant (M, B, MPubKey , MSessKey , SndM , RcvM )
        ∧ customer (M, C, B, MPubKey ,CSessKey , SndC , RcvC )
        ∧ bank (M, C, B, MSessKey , CSessKey ,SndB , RcvB )
end role
% ==========
role environment ( )
def=
const
        merchant_bank , bank_merchant , customer_bank , bank_customer :
            protocol_id ,
        m, c, b, i: agent ,
        mbsk , cbsk : symmetric_key ,
        mpk: public_key
intruder_knowledge = {m, c, b, i, mpk, merchant_bank , bank_merchant,
        customer_bank , bank_customer }
composition
        session (m, c, b, mpk , mbsk , cbsk )
        ∧ session (m, c, b, mpk , mbsk , cbsk )
end role
% ==========
goal
[ ](
        (aknows (M, B, bank_merchant , MTxId .{MTxId.Res} _MSessKey ))
        =>
        (aknows (B, M, bank_merchant , MTxId .{MTxId.Res} _MSessKey ))
)
[ ](
        (aknows (C, B, bank_customer , CTxId .{CTxId.Res} _CSessKey ))
        =>
        (aknows (B, C, bank_customer , CTxId .{CTxId.Res} _CSessKey ))
)
[ ](
        (aknows (B, M, merchant_bank , M.{M.BTxId} _MSessKey ))
        =>
        (aknows (M, B, merchant_bank , M.{M.BTxId} _MSessKey ))
)
[ ](
        (aknows (B, C, customer_bank , C.{C.CTxId.M. MTxId. Rcpt } _CSessKey ))
        =>
        (aknows (C, B, customer_bank , C.{C.CTxId.M. MTxId. Rcpt } _CSessKey ))
)
end goal
% ==========
environment ( )
```

10. AVISPA Model File for Second Variation of Secure Protocol

As mentioned above AVISPA was also used to validate the security of the second variation of the secure protocol. Specifically, AVISPA version 1.1 was used with the model file below. First, AVISPA's -satmc option was used to check that the protocol flow itself is executable, i.e., that there are no mismatched send (Snd) and receive (Rcv) statements. The protocol flow was then manually double-checked using the -ofmc-p options, which allows a step-by-step trace. aknows had to be commented out in the process, since this -ofmc does not support it; however, this is not an issue since this step was only used to ensure that the message flow is correct; it was not used to check for security per se. Finally, the cl-atse option was used to do the actual validation.

```
role merchant(
    M, C, B: agent,
    Hash: hash_func,
    MPubKey, BPubKey: public_key,
    MSessKey: symmetric_key,
    Snd, Rcv: channel(dy))
played_by M def=
local
    MTxId, MRcpt, BTxId, MCnf, BRes, MBNonce1, BMNonce4, BMNonce5,
BMNonce8: text,
    State: nat
init
    State := 0
transition
0. State = 0
  ^ Rcv(start)
    =|>
    State' := 1
    % Create merchant session identifier, receipt, and first nonce
  ^ MTxId' := new( )
  ^ MRcpt' := new( )
  ^ MBNonce1' := new( )
    % Send out payment request to customer
  ^ Snd(M.M.MTxId'.MRcpt'.{Hash(M.MTxId'.MRcpt')}_inv(MPubKey))
  ^ aknows(M, C, merchant_customer_ini, M.M.MTxId'.MRcpt'.{Hash
(M.MTxId'.MRcpt')}_inv(MPubKey))
    % Notify bank as well
  ^
Snd(M.{M.MTxId'.MRcpt'.MBNonce1'.{Hash(M.MTxId'.MRcpt'.MBNonce1')}_inv
(MPubKey)}_MSessKey)
  ^ aknows(M, B, merchant_bank_ini, M.{M.MTxId'.MRcpt'.MBNonce1'.{Hash
(M.MTxId'.MRcpt'.MBNonce1')}_inv(MPubKey)}_MSessKey)
1. State = 1
    % Receive reply from bank
  ^ Rcv(MTxId.{MTxId.BTxId'.MRcpt.BMNonce4'.{Hash
(MTxId.BTxId'.MRcpt.BMNonce4')}_inv(BPubKey)}_MSessKey)
    =|>
    State' := 2
  ^ aknows(M, B, bank_merchant_ini,
MTxId.{MTxId.BTxId'.MRcpt.BMNonce4'.
{Hash(MTxId.BTxId'.MRcpt.BMNonce4')}_inv(BPubKey)}_MSessKey)
    % Create confirmation (i.e., confirm/deny) and second nonce
  ^ MCnf' := new( )
  ^ MBNonce5' := new( )
    % Send confirmation to bank
  ^
Snd(M.{M.BTxId'.MCnf'.MBNonce5'.{Hash(M.BTxId'.MCnf'.MBNonce5')}_inv
(MPubKey)}_MSessKey)
  ^ aknows(M, B, merchant_bank_cnf, M.{M.BTxId'.MCnf'.MBNonce5'.{Hash
(M.BTxId'.MCnf'.MBNonce5')}_inv(MPubKey)}_MSessKey)
2. State = 2
    % Receive commit from bank
  ^
Rcv(MTxId.{MTxId.BRes'.BMNonce8'.{Hash(MTxId.BRes'.BMNonce8')}_inv
(BPubKey)}_MSessKey)
    =|>
    State' := 3
  ^ aknows(M, B, bank_merchant_res, MTxId.{MTxId.BRes'.BMNonce8'.{Hash
(MTxId.BRes'.BMNonce8')}_inv(BPubKey)}_MSessKey)
end role
%
================================================================
role customer(
    M, C, B: agent,
    Hash: hash_func,
    MPubKey, CPubKey, BPubKey: public_key,
    CSessKey: symmetric_key,
    Snd, Rcv: channel(dy))
played_by C def=
local
```

```
    MTxId, MRcpt, CTxId, BTxId, CCnf, BRes, CBNonce2, BCNonce3,
CBNonce6, BCNonce7: text,
    State: nat
init
    State := 50
transition
0. State = 50
    % Receive request from merchant
       ^Rcv(M.M.MTxId'.MRcpt'.{Hash(M.MTxId'.MRcpt')}_inv(MPubKey))
    =|>
    State' := 51
       ^aknows(C, M, merchant_customer_ini, M.M.MTxId'.MRcpt'.{Hash
(M.MTxId'.MRcpt')}_inv(MPubKey))
    % Create customer session identifier and first nonce
       ^CTxId' := new( )
       ^CBNonce2' := new( )
    % Send request to bank
       ^Snd(C.{C.CTxId'.M.{M.MTxId'.MRcpt'}_inv(MPubKey).CBNonce2'.{Hash
(C.CTxId'.M.{M.MTxId'.MRcpt'}_inv(MPubKey).CBNonce2')}_inv(CPubKey)}
_CSessKey)
       ^aknows(C, B, customer_bank_ini, C.{C.CTxId'.M.{M.MTxId'.MRcpt'}_inv
(MPubKey).CBNonce2'.{Hash(C.CTxId'.M.{M.MTxId'.MRcpt'}_inv
(MPubKey).CBNonce2')}_inv(CPubKey)}_CSessKey)
1. State = 51
    % Receive reply from bank
       ^Rcv(CTxId.{CTxId.BTxId'.MRcpt.BCNonce3'.{Hash
(CTxId.BTxId'.MRcpt.BCNonce3')}_inv(BPubKey)}_CSessKey)
    =|>
    State' := 52
       ^aknows(C, B, bank_customer_ini, CTxId.{CTxId.BTxId'.MRcpt.BCNonce3'.
{Hash(CTxId.BTxId'.MRcpt.BCNonce3')}_inv(BPubKey)}_CSessKey)
    % Create confirmation (i.e., confirm/deny) and second nonce
       ^CCnf' := new( )
       ^CBNonce6' := new( )
    % Send confirmation to bank
       ^Snd(C.{C.BTxId'.CCnf'.CBNonce6'.{Hash(C.BTxId'.CCnf'.CBNonce6')}_inv
(CPubKey)}_CSessKey)
       ^aknows(C, B, customer_bank_cnf, C.{C.BTxId'.CCnf'.CBNonce6'.{Hash
(C.BTxId'.CCnf'.CBNonce6')}_inv(CPubKey)}_CSessKey)
2. State = 52
    % Receive commit from bank
       ^Rcv(CTxId.{CTxId.BRes'.BCNonce7'.{Hash(CTxId.BRes'.BCNonce7')}_inv
(BPubKey)}_CSessKey)
    =|>
    State' := 53
       ^aknows(C, B, bank_customer_res, CTxId.{CTxId.BRes'.BCNonce7'.{Hash
(CTxId.BRes'.BCNonce7')}_inv(BPubKey)}_CSessKey)
end role
% ================================================================
role bank(
    M, C, B: agent,
    Hash: hash_func,
    MPubKey, CPubKey, BPubKey: public_key,
    MSessKey, CSessKey: symmetric_key,
    Snd, Rcv: channel(dy))
played_by B def=
local
    MTxId, MRcpt, CTxId, BTxId, MCnf, CCnf, BRes, MBNonce1, CBNonce2,
BCNonce3, BMNonce4, MBNonce5, CBNonce6, BCNonce7, BMNonce8: text,
    State: nat
init
    State := 100
transition
0. State = 100
    % Receive request from merchant
       ^
Rcv(M.{M.MTxId'.MRcpt'.MBNonce1'.{Hash(M.MTxId'.MRcpt'.MBNonce1')}_inv
(MPubKey)}_MSessKey)
    =|>
    State' := 101
       ^aknows(B, M, merchant_bank_ini, M.{M.MTxId'.MRcpt'.MBNonce1'.{Hash
(M.MTxId'.MRcpt'.MBNonce1')}_inv(MPubKey)}_MSessKey)
1.= State = 101
    % Receive request from customer
       ^Rcv(C.{C.CTxId'.M.{M.MTxId.MRcpt}_inv(MPubKey).CBNonce2'.{Hash
(C.CTxId'.M.{M.MTxId.MRcpt}_inv(MPubKey).CBNonce2')}_inv(CPubKey)}_CSess
Key)
    =|>
```

```
State' := 102
  aknows(B, C, customer_bank_ini, C.{C.CTxId'.M.{M.MTxId.MRcpt}_inv
(MPubKey).CBNonce2'.{Hash(C.CTxId'.M.{M.MTxId.MRcpt}_inv
(MPubKey).CBNonce2')}_inv(CPubKey)}_CSessKey)
    % Create bank session identifier and first set of nonces
  BTxId' := new( )
  BCNonce3' := new( )
  BMNonce4' := new( )
    % Send confirmation request to customer and merchant
  Snd(CTxId'.{CTxId'.BTxId'.MRcpt.BCNonce3'.{Hash
(CTxId'.BTxId'.MRcpt.BCNonce3')}_inv(BPubKey)}_CSessKey)
  Snd(MTxId.{MTxId.BTxId'.MRcpt.BMNonce4'.{Hash
(MTxId.BTxId'.MRcpt.BMNonce4')}_inv(BPubKey)}_MSessKey)
     aknows(B, C, bank_customer_ini,
CTxId'.{CTxId'.BTxId'.MRcpt.BCNonce3'.
{Hash(CTxId'.BTxId'.MRcpt.BCNonce3')}_inv(BPubKey)}_CSessKey)
     aknows(B, M, bank_merchant_ini,
MTxId.{MTxId.BTxId'.MRcpt.BMNonce4'.
{Hash(MTxId.BTxId'.MRcpt.BMNonce4')}_inv(BPubKey)}_MSessKey)
2. State = 102
    % Receive confirmation from merchant
Rcv(M.{M.BTxId.MCnf'.MBNonce5'.{Hash(M.BTxId.MCnf'.MBNonce5')}_inv
(MPubKey)}_MSessKey)
  =|>
  State' := 103
    aknows(B, M, merchant_bank_cnf, M.{M.BTxId.MCnf'.MBNonce5'.{Hash
(M.BTxId.MCnf'.MBNonce5')}_inv(MPubKey)}_MSessKey)
3. State = 103
    % Receive confirmation from customer
    Rcv(C.{C.BTxId.CCnf'.CBNonce6'.{Hash(C.BTxId.CCnf'.CBNonce6')}_inv
(CPubKey)}_CSessKey)
  =|>
  State' := 104
    aknows(B, C, customer_bank_cnf, C.{C.BTxId.CCnf'.CBNonce6'.{Hash
(C.BTxId.CCnf'.CBNonc e6')}_inv(CPubKey)}_CSessKey)
    % Create bank response (processing of confirmation and balance check done at
higher level) and second set of nonces
  BRes' := new( )
  BCNonce7' := new( )
  BMNonce8' := new( )
    % Send out response to merchant and customer
  Snd(CTxId.{CTxId.BRes'.BCNonce7'.{Hash(CTxId.BRes'.BCNonce7')}_inv
(BPubKey)}_CSessKey)

Snd(MTxId.{MTxId.BRes'.BMNonce8'.{Hash(MTxId.BRes'.BMNonce8')}_inv
(BPubKey)}_MSessKey)
    aknows(B, C, bank_customer_res, CTxId.{CTxId.BRes'.BCNonce7'.{Hash
(CTxId.BRes'.BCNonce7')}_inv(BPubKey)}_CSessKey)
    aknows(B, M, bank_merchant_res, MTxId.{MTxId.BRes'.BMNonce8'.{Hash
(MTxId.BRes'.BMNonce8')}_inv(BPubKey)}_MSessKey)
end role
%
================================================================
role session(
   M, C, B: agent,
   Hash: hash_func,
   MPubKey, CPubKey, BPubKey: public_key,
   MSessKey, CSessKey: symmetric_key
)
def=
local
   SndM, RcvM, SndC, RcvC, SndB, RcvB: channel(dy)
composition
   merchant(M, C, B, Hash, MPubKey, BPubKey, MSessKey, SndM, RcvM)
   customer(M, C, B, Hash, MPubKey, CPubKey, BPubKey, CSessKey, SndC,
RcvC)
   bank(M, C, B, Hash, MPubKey, CPubKey, BPubKey, MSessKey, CSessKey,
SndB, RcvB)
end role
%
================================================================
role environment( )
def=
const
   merchant_customer_ini, merchant_bank_ini, customer_bank_ini,
bank_customer_ini, bank_merchant_ini, customer_bank_cnf, merchant_bank_cnf,
bank_customer_res, bank_merchant_res: protocol_id,
   m, c, b, i: agent,
```

```
    h: hash_func,
    mbsk, cbsk: symmetric_key,
    mpk, cpk, bpk: public_key
    intruder_knowledge = {m, c, b, i, h, mpk, cpk, bpk, merchant_customer_ini,
merchant_bank_ini, customer_bank_ini, bank customer_ini, bank_merchant_ini,
customer_bank_cnf, merchant_bank_cnf, bank_customer_res, bank_merchant_res}
% intruder_knowledge = {m, c, b, i, h, mpk, cpk, bpk, inv(mpk), inv(cpk), inv(bpk),
mbsk, cbsk, merchant_customer_ini, merchant_bank_ini, customer_bank_ini,
bank_customer_ini, bank_merchant_ini, customer_bank_cnf, merchant_bank_cnf,
bank_customer_res, bank_merchant_res}
composition
    session(m, c, b, h, mpk, cpk, bpk, mbsk, cbsk)
  ^ session(m, c, b, h, mpk, cpk, bpk, mbsk, cbsk)
end role
%
================================================================
goal
[ ] (
    (aknows(C, M, merchant customer_ini, M.M.MTxId.MRcpt.{Hash
(M.MTxId.MRcpt)}_inv(MPubKey)))
    =>
    (aknows(M, C, merchant_customer_ini, M.M.MTxId.MRcpt.{Hash
(M.MTxId.MRcpt)}_inv(MPubKey)))
)
[ ] (
    (aknows(B, M, merchant_bank_ini, M.{M.MTxId.MRcpt.MBNonce1.{Hash
(M.MTxId.MRcpt.MBNonce1)}_inv(MPubKey)}_MSessKey))
    =>
    (aknows(M, B, merchant_bank_ini, M.{M.MTxId.MRcpt.MBNonce1.{Hash
(M.MTxId.MRcpt.MBNonce1)}_inv(MPubKey)}_MSessKey))
)
[ ] (
    (aknows(B, C, customer_bank_ini, C.{C.CTxId.M.{M.MTxId.MRcpt}_inv
(MPubKey).CBNonce2.{Hash(C.CTxId.M.{M.MTxId.MRcpt}_inv(MPubKey).
CBNonce2)}_inv(CPubKey)}_CSessKey))
    =>
    (aknows(C, B, customer_bank_ini, C.{C.CTxId.M.{M.MTxId.MRcpt}_inv
(MPubKey).CBNonce2.{Hash(C.CTxId.M.{M.MTxId.MRcpt}_inv(MPubKey).
CBNonce2)}
_inv(CPubKey)}_CSessKey))
)
[ ] (
    (aknows(C, B, bank_customer_ini,
CTxId.{CTxId.BTxId.MRcpt.BCNonce3.{Hash
(CTxId.BTxId.MRcpt.BCNonce3)}_inv(BPubKey)}_CSessKey))
    =>
    (aknows(B, C, bank_customer_ini,
CTxId.{CTxId.BTxId.MRcpt.BCNonce3.{Hash
(CTxId.BTxId.MRcpt.BCNonce3)}_inv(BPubKey)}_CSessKey))
)
[ ] (
    (aknows(M, B, bank_merchant_ini, MTxId. {MTxId.BTxId.MRcpt.BMNonce4.
{Hash(MTxId.BTxId.MRcpt.BMNonce4)}_inv(BPubKey)}_MSessKey))
    =>
    (aknows(B, M, bank_merchant_imi, MTxId.{MTxId.BTxId.MRcpt.BMNonce4.
{Hash(MTxId.BTxId.MRcpt.BMNonce4)}_inv(BPubKey)}_MSessKey))
)
[ ] (
    (aknows(B, M, merchant_bank_cnf, M.{M.BTxId.MCnf.MBNonce5.{Hash
(M.BTxId.MCnf.MBNonce5)}_inv(MPubKey)}_MSessKey))
    =>
    (aknows(M, B, merchant_bank_cnf, M.{M.BTxId.MCnf.MBNonce5.{Hash
(M.BTxId.MCnf.MBNonce5)}_inv(MPubKey)}_MSessKey))
)
[ ] (
    (aknows(B, C, customer_bank_cnf, C.{C.BTxId.CCnf.CBNonce6.{Hash
(C.BTxId.CCnf.CBNonce6)}_inv(CPubKey)}_CSessKey))
    =>
    (aknows(C, B, customer_bank_cnf, C.{C.BTxId.CCnf.CBNonce6.{Hash
(C.BTxId.CCnf.CBNonce6)}_inv(CPubKey)}_CSessKey))
)
[ ] (
    (aknows(C, B, bank_customer_res, CTxId.{CTxId.BRes.BCNonce7.{Hash
(CTxId.BRes.BCNonce7)}_inv(BPubKey)}_CSessKey))
    =>
    (aknows(B, C, bank_customer_res, CTxId.{CTxId.BRes.BCNonce7.{Hash
(CTxId.BRes.BCNonce7)}_inv(BPubKey)}_CSessKey))
)
[ ] (
```

-continued

```
    (aknows(M, B, bank_merchant_res, MTxId.{MTxId.BRes.BMNonce8.{Hash
(MTxId.BRes.BMNonce8)}_inv(BPubKey)}_MSessKey))
    =>
    (aknows(B, M, bank_merchant_res, MTxId.{MTxId.BRes.BMNonce8.{Hash
(MTxId.BRes.BMNonce8)}_inv(BPubKey)}_MSessKey))
)
end goal
%
=====================================================================
environment( )
```

11. Computing Environment

Figure 10:
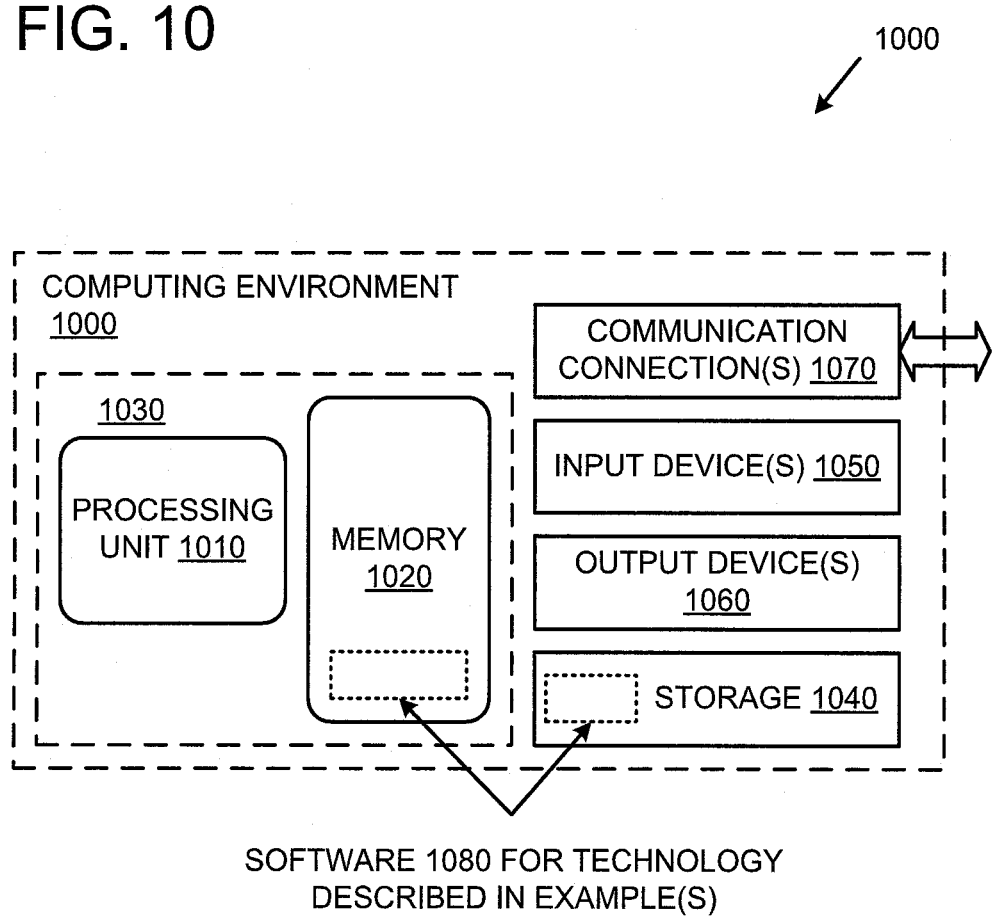
FIG. 10 is a block diagram illustrating an example of a computing environment that can be used to implement any of the technologies described herein.

FIG. 10 illustrates a generalized example of a suitable computing environment 1000 in which described embodiments, techniques, and technologies may be implemented. The computing environment 1000 is not intended to suggest any limitation as to scope of use or functionality of the technology, as the technology may be implemented in diverse general-purpose or special-purpose computing environments. For example, the disclosed technology may be implemented with other computer system configurations, including hand held devices, multiprocessor systems (e.g., one of which could be a cryptographic processor), microprocessor-based or programmable consumer electronics, network PCs, minicomputers, mainframe computers, and the like. The disclosed technology may also be practiced in distributed computing environments where tasks are performed by remote processing devices that are linked through a communications network. In a distributed computing environment, program modules may be located in both local and remote memory storage devices.

With reference to FIG. 10, the computing environment 1000 includes at least one central processing unit 1010 and memory 1020. In FIG. 10, this most basic configuration 1030 is included within a dashed line. The central processing unit 1010 executes computer-executable instructions and may be a real or a virtual processor. In a multi-processing system, multiple processing units execute computer-executable instructions to increase processing power and as such, multiple processors can be running simultaneously. The memory 1020 may be volatile memory (e.g., registers, cache, RAM), non-volatile memory (e.g., ROM, EEPROM, flash memory, etc.), or some combination of the two. The memory 1020 stores software 1080 that can, for example, implement the technologies, such as the secure protocol implementations, described herein. A computing environment may have additional features. For example, the computing environment 1000 includes storage 1040, one or more input devices 1050, one or more output devices 1060, and one or more communication connections 1070. An interconnection mechanism (not shown) such as a bus, a controller, or a network, interconnects the components of the computing environment 1000. Typically, operating system software (not shown) provides an operating environment for other software executing in the computing environment 1000, and coordinates activities of the components of the computing environment 1000.

The computer-readable storage 1040 may be removable or non-removable media, and includes magnetic disks, magnetic tapes or cassettes, CD-ROMs, CD-RWs, DVDs, or any other tangible medium which can be used to store information and which can be accessed within the computing environment 1000. The storage 1040 stores instructions for the software 1080, which can implement technologies described herein.

The input device(s) 1050 may be a touch input device, such as a keyboard, keypad, mouse, pen, or trackball, a voice input device, a scanning device, or another device, that provides input to the computing environment 1000. For audio, the input device(s) 1050 may be a sound card or similar device that accepts audio input in analog or digital form, or a CD-ROM reader that provides audio samples to the computing environment 1000. The output device(s) 1060 may be a display, printer, speaker, CD-writer, or another device that provides output from the computing environment 1000.

The communication connection(s) 1070 enable communication over a communication path (e.g., a connecting network, such as a wired or wireless network) to another computing entity. The communication medium conveys information such as computer-executable instructions, compressed graphics information, or other data in a modulated data signal.

In some implementations, the computing environment 1000 is implemented as a potted device. In a specific implementation, components 1010, 1020, 1030, 1040, 1050, and 1060 are incorporated in the potted device (e.g., incorporated in a single hardware unit). The secure protocol technologies described herein can be implemented, at least in part, in hardware (including firmware) of such a potted device (e.g., implemented in a cryptographic hardware component).

Automated Methods

Any of the methods described herein can be performed via one or more computer-readable media (e.g., storage or other tangible media) comprising (e.g., having or storing) computer-executable instructions for performing (e.g., causing a computing device to perform) such methods. Operation can be fully automatic, semi-automatic, or involve manual intervention.

Combinations

The technologies of any example described herein can be combined with the technologies of any one or more other examples described herein.

Alternatives

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. A method, implemented at least in part by a financial institution system, for implementing a secure protocol for transactions, the method comprising:
   receiving, by the financial institution system from a customer using the secure protocol, a first communication comprising information regarding a transaction to be conducted between a merchant and the customer;
   receiving, by the financial institution system from the merchant using the secure protocol, an eighth communication comprising information regarding the transaction to be conducted between the merchant and the customer;
   in response to at least one of the first and eighth communication, sending, by the financial institution system to the merchant using the secure protocol, a second communication comprising a confirmation request to the merchant regarding the transaction;
   in response to at least one of the first and eighth communication, sending, by the financial institution system to the customer using the secure protocol, a seventh communication comprising a confirmation request to the customer regarding the transaction;
   receiving, by the financial institution system from the customer using the secure protocol, a third communication comprising information indicating the customer confirms the transaction;
   receiving, by the financial institution system using the secure protocol, a fourth communication comprising information indicating the merchant confirms the transaction;
   processing, by the financial institution system, the transaction, wherein customer financial information used in processing the transaction is located solely at the financial institution system, and wherein the secure protocol does not communicate the customer financial information to the merchant, or to the customer;
   sending, by the financial institution system to the customer using the secure protocol, a fifth communication comprising results of the processing; and
   sending, by the financial institution system to the merchant using the secure protocol, a sixth communication comprising results of the processing;
   wherein communications between the financial institution system and the customer are encrypted with a single-use customer session key, and wherein communications between the financial institution system and the merchant are encrypted with a single-use merchant session key;
   wherein it is not possible for any of the financial institution system, the merchant, and the customer to repudiate the transaction; and
   wherein communications to and from the merchant are performed, at least in part, via a merchant device associated with the merchant, and wherein communications to and from the customer are performed, at least in part, via a customer device associated with the customer.

2. The method of claim 1 wherein the fourth communication is received by the financial institution system from the merchant using the secure protocol.

3. The method of claim 1 wherein the fourth communication is received by the financial institution system from the customer using the secure protocol, wherein the customer received the information indicating the merchant confirms the transaction from the merchant using the secure protocol.

4. The method of claim 1, further comprising:
   prior to the transaction, obtaining, by the customer from the financial institution system, a plurality of single-use customer session keys, wherein the plurality of single-use customer session keys includes the single-use customer session key; and
   prior to the transaction, obtaining, by the merchant from the financial institution system, a plurality of single-use merchant session keys, wherein the plurality of single-use merchant session keys includes the single-use merchant session key.

5. The method of claim 1 wherein the secure protocol has been validated to be secure.

6. The method of claim 5 wherein validation of the secure protocol has been performed, at least in part, by the Automated Validation of Internet Security Protocols and Applications tool.

7. The method of claim 1 wherein the secure protocol provides the following assurances:
   on the part of the financial institution system: freshness, authentication, and confidentiality;
   on the part of the merchant: freshness, authentication, confidentiality, integrity, and non-repudiation; and
   on the part of the customer: freshness, authentication, and confidentiality.

8. The method of claim 1 wherein the customer device comprises a potted device, and wherein the secure protocol is implemented, at least in part, in hardware of the potted device.

9. The method of claim 1, further comprising:
   prior to the transaction, obtaining, by the customer from the financial institution system, a listing of authorized merchants.

10. The method of claim 1 wherein the communications of the secure protocol enable the merchant to prove that the financial institution system made an error, and wherein the communications of the secure protocol enable the customer to prove that the financial institution system made an error.

11. The method of claim 1 wherein the secure protocol provides the following assurances:
   on the part of the financial institution system: freshness, authentication, confidentiality, integrity, and non-repudiation;
   on the part of the merchant: freshness, authentication, confidentiality, integrity, and non-repudiation; and
   on the part of the customer: freshness, authentication, confidentiality, integrity, and non-repudiation.

12. A computer-readable memory or storage device storing computer-executable instructions for causing a computing device to perform a method for implementing a secure protocol for transactions, the method comprising:
   receiving, by a financial institution system from a customer using the secure protocol, a first communication comprising information regarding a transaction to be conducted between a merchant and the customer;
   receiving, by the financial institution system from the merchant using the secure protocol, an eighth communication comprising information regarding the transaction to be conducted between the merchant and the customer;
   in response to at least one of the first and eighth communication, sending, by the financial institution system to the merchant using the secure protocol, a second communication comprising a confirmation request to the merchant regarding the transaction;
   in response to at least one of the first and eighth communication, sending, by the financial institution system to the customer using the secure protocol, a seventh communication comprising a confirmation request to the customer regarding the transaction;

receiving, by the financial institution system from the customer using the secure protocol, a third communication comprising information indicating the customer confirms the transaction;

receiving, by the financial institution system using the secure protocol, a fourth communication comprising information indicating the merchant confirms the transaction;

processing, by the financial institution system, the transaction, wherein customer financial information used in processing the transaction is located solely at the financial institution system, and wherein the secure protocol does not communicate the customer financial information to the merchant or to the customer;

sending, by the financial institution system to the customer using the secure protocol, a fifth communication comprising results of the processing; and sending, by the financial institution system to the merchant using the secure protocol, a sixth communication comprising results of the processing;

wherein communications between the financial institution system and the customer are encrypted with a single-use customer session key, and wherein communications between the financial institution system and the merchant are encrypted with a single-use merchant session key;

wherein it is not possible for any of the financial institution system, the merchant, and the customer to repudiate the transaction; and wherein communications to and from the merchant are performed, at least in part, via a merchant device associated with the merchant, and wherein communications to and from the customer are performed, at least in part, via a customer device associated with the customer.

13. The computer-readable memory or storage device of claim 12 wherein the fourth communication is received by the financial institution system from the merchant using the secure protocol.

14. The computer-readable memory or storage device of claim 12 wherein the fourth communication is received by the financial institution system from the customer using the secure protocol, wherein the customer received the information indicating the merchant confirms the transaction from the merchant using the secure protocol.

15. The computer-readable memory or storage device of claim 12, the method further comprising:
   prior to the transaction, obtaining, by the customer from the financial institution system, a plurality of single-use customer session keys, wherein the plurality of single-use customer session keys includes the single-use customer session key; and
   prior to the transaction, obtaining, by the merchant from the financial institution system, a plurality of single-use merchant session keys, wherein the plurality of single-use merchant session keys includes the single-use merchant session key.

16. The computer-readable memory or storage device of claim 12 wherein the secure protocol provides the following assurances:
   on the part of the financial institution system: freshness, authentication, and confidentiality;
   on the part of the merchant: freshness, authentication, confidentiality, integrity, and non-repudiation; and
   on the part of the customer: freshness, authentication, and confidentiality.

17. The computer-readable memory or storage device of claim 12 wherein the customer device comprises a potted device, and wherein the secure protocol is implemented, at least in part, in hardware of the potted device.

18. The computer-readable memory or storage device of claim 12 wherein the communications of the secure protocol enable the merchant to prove that the financial institution system made an error, and wherein the communications of the secure protocol enable the customer to prove that the financial institution system made an error.

19. The computer-readable memory or storage device of claim 12 wherein the secure protocol provides the following assurances:
   on the part of the financial institution system: freshness, authentication, confidentiality, integrity, and non-repudiation;
   on the part of the merchant: freshness, authentication, confidentiality, integrity, and non-repudiation; and
   on the part of the customer: freshness, authentication, confidentiality, integrity, and non-repudiation.

20. One or more computing devices, comprising processing units and memory, of a financial institution system configured to perform a method implementing a secure protocol for transactions, the method comprising:
   receiving, by the financial institution system from a customer using the secure protocol, a first communication comprising information regarding a transaction to be conducted between a merchant and the customer;
   receiving, by the financial institution system from the merchant using the secure protocol, an eighth communication comprising information regarding the transaction to be conducted between the merchant and the customer;
   in response to at least one of the first and eighth communication, sending, by the financial institution system to the merchant using the secure protocol, a second communication comprising a confirmation request to the merchant regarding the transaction;
   in response to at least one of the first and eighth communication, sending, by the financial institution system to the customer using the secure protocol, a seventh communication comprising a confirmation request to the customer regarding the transaction;
   receiving, by the financial institution system from the customer using the secure protocol, a third communication comprising information indicating the customer confirms the transaction;
   receiving, by the financial institution system using the secure protocol, a fourth communication comprising information indicating the merchant confirms the transaction;
   processing, by the financial institution system, the transaction, wherein customer financial information used in processing the transaction is located solely at the financial institution system, and wherein the secure protocol does not communicate the customer financial information to the merchant or to the customer;
   sending, by the financial institution system to the customer using the secure protocol, a fifth communication comprising results of the processing; and
   sending, by the financial institution system to the merchant using the secure protocol, a sixth communication comprising results of the processing;
   wherein communications between the financial institution system and the customer are encrypted with a single-use customer session key, and wherein communications between the financial institution system and the merchant are encrypted with a single-use merchant session key;

wherein it is not possible for any of the financial institution system, the merchant, and the customer to repudiate the transaction; and wherein communications to and from the merchant are performed, at least in part, via a merchant device associated with the merchant, and wherein communications to and from the customer are performed, at least in part, via a customer device associated with the customer.

21. The one or more computing devices of claim 20, wherein the fourth communication is received by the financial institution system from the merchant using the secure protocol.

22. The one or more computing devices of claim 20 wherein the fourth communication is received by the financial institution system from the customer using the secure protocol, wherein the customer received the information indicating the merchant confirms the transaction from the merchant using the secure protocol.

23. The one or more computing devices of claim 20, the method further comprising:
   prior to the transaction, obtaining, by the customer from the financial institution system, a plurality of single-use customer session keys, wherein the plurality of single-use customer session keys includes the single-use customer session key; and
   prior to the transaction, obtaining, by the merchant from the financial institution system, a plurality of single-use merchant session keys, wherein the plurality of single-use merchant session keys includes the single-use merchant session key.

24. The one or more computing devices of claim 20 wherein the secure protocol provides the following assurances:
   on the part of the financial institution system: freshness, authentication, and confidentiality;
   on the part of the merchant: freshness, authentication, confidentiality, integrity, and non-repudiation; and
   on the part of the customer: freshness, authentication, and confidentiality.

25. The one or more computing devices of claim 20 wherein the customer device comprises a potted device, and wherein the secure protocol is implemented, at least in part, in hardware of the potted device.

26. The one or more computing devices of claim 20 wherein the communications of the secure protocol enable the merchant to prove that the financial institution system made an error, and wherein the communications of the secure protocol enable the customer to prove that the financial institution system made an error.

27. The one or more computing devices of claim 20 wherein the secure protocol provides the following assurances:
   on the part of the financial institution system: freshness, authentication, confidentiality, integrity, and non-repudiation;
   on the part of the merchant: freshness, authentication, confidentiality, integrity, and non-repudiation; and
   on the part of the customer: freshness, authentication, confidentiality, integrity, and non-repudiation.

* * * * *